US012681358B2

(12) United States Patent
Kato

(10) Patent No.: US 12,681,358 B2
(45) Date of Patent: Jul. 14, 2026

(54) WAVELENGTH CONVERTER AND OPTICAL TRANSMISSION SYSTEM

(71) Applicant: 1FINITY Inc., Kawasaki (JP)

(72) Inventor: Tomoyuki Kato, Yokohama (JP)

(73) Assignee: FINITY Inc., Kawasaki (JP)

( * ) Notice: Subject to any disclaimer, the term of this patent is extended or adjusted under 35 U.S.C. 154(b) by 299 days.

(21) Appl. No.: 18/348,393

(22) Filed: Jul. 7, 2023

(65) Prior Publication Data

US 2024/0103338 A1 Mar. 28, 2024

(30) Foreign Application Priority Data

Sep. 22, 2022 (JP) ................................. 2022-151925

(51) Int. Cl.
| | |
|---|---|
| *G02F 1/35* | (2006.01) |
| *G02B 27/28* | (2006.01) |
| *G02F 1/39* | (2006.01) |
| *H04B 10/572* | (2013.01) |
| *H04J 14/02* | (2006.01) |

(52) U.S. Cl.
CPC ......... *G02F 1/3532* (2013.01); *G02B 27/283* (2013.01); *G02F 1/395* (2013.01); *H04B 10/572* (2013.01); *H04J 14/0307* (2023.08); *G02F 2203/055* (2013.01)

(58) Field of Classification Search
CPC .................................................. G02F 1/3532
See application file for complete search history.

(56) References Cited

U.S. PATENT DOCUMENTS

| | | | |
|---|---|---|---|
| 6,459,525 B1 | 10/2002 | Aso et al. | |
| 11,668,870 B2 * | 6/2023 | Kato ..................... | H04B 10/506 |
| | | | 385/122 |
| 2011/0063711 A1 | 3/2011 | Kanter | |
| 2020/0059313 A1 * | 2/2020 | Kato ..................... | H04B 10/27 |
| 2020/0271855 A1 * | 8/2020 | Kato ..................... | G02F 2/004 |

(Continued)

FOREIGN PATENT DOCUMENTS

| | | |
|---|---|---|
| JP | 2001-75136 | 3/2001 |
| JP | 2004-163558 | 6/2004 |

(Continued)

OTHER PUBLICATIONS

Ho et al.,"200-nm-bandwidth fiber optical amplifier combining parametric and Raman gain" Journal of Lightwave Technology, vol. 19,No. 7, Jul. 2001, pp. 977-981.

(Continued)

*Primary Examiner* — Rhonda S Peace
(74) *Attorney, Agent, or Firm* — Fujitsu Intellectual Property Center

(57) ABSTRACT

A wavelength converter includes: a first multiplexer that combines input signal light with wavelength-conversion excitation light; a second multiplexer that combines the signal light with Raman excitation light; a first nonlinear optical medium that generates wavelength-converted light of the signal light, based on a nonlinear optical effect; and a second nonlinear optical medium that amplifies wavelength-converted light of the signal light output from the first nonlinear optical medium. A wavelength of the Raman excitation light being a wavelength within an amplification band that allows Raman amplification of wavelength-converted light.

12 Claims, 23 Drawing Sheets

(56)                    References Cited

U.S. PATENT DOCUMENTS

| | | | | |
|---|---|---|---|---|
| 2021/0103200 A1* | 4/2021 | Nakagawa | .............. | G02F 1/365 |
| 2022/0060273 A1* | 2/2022 | Kato | ...................... | H04J 14/06 |
| 2022/0070555 A1* | 3/2022 | Yamauchi | ........... | H04J 14/0265 |
| 2022/0229238 A1* | 7/2022 | Kato | .................... | G02B 6/2773 |
| 2022/0285904 A1* | 9/2022 | Di Teodoro | ........ | H01S 3/10038 |
| 2024/0103338 A1* | 3/2024 | Kato | .................... | G02B 27/283 |

FOREIGN PATENT DOCUMENTS

| | | |
|---|---|---|
| JP | 2006-128408 | 5/2006 |
| JP | 2016-218173 A | 12/2016 |
| JP | 2018-191074 A | 11/2018 |

OTHER PUBLICATIONS

Ummy et al., "Extending the Gain Bandwidth of Combined Raman-Parametric Fiber Amplifiers Using Highly Nonlinear Fiber" Journal of Lightwave Technology, vol. 27, No. 5, Mar. 2009, pp. 583-589.
Klejs et al., "SNR-Improvement of Four-Wave-Mixing Wavelength Converters using Raman Amplification" European Conference on Optical Communication (ECOC), Sep. 13-16, 2021, IEEE.
Japanese Office Action dated Feb. 24, 2026 for corresponding Japanese Patent Application No. 2022-151925, with English Translation, 10 pages.

* cited by examiner

INPUT TO FIRST NONLINEAR OPTICAL MEDIUM

INPUT TO SECOND NONLINEAR OPTICAL MEDIUM

OUTPUT FROM SECOND NONLINEAR OPTICAL MEDIUM

EXCITATION LIGHT λpc
SIGNAL
LIGHT C

BEFORE WAVELENGTH CONVERSION

WAVELENGTH-CONVERTED LIGHT CV

NONLINEAR NOISE N

AFTER WAVELENGTH CONVERSION

INPUT TO FIRST NONLINEAR OPTICAL MEDIUM $\lambda pc$

RAMAN GAIN $\lambda pr$

WAVELENGTH

SIGNAL LIGHT C

INPUT TO SECOND NONLINEAR OPTICAL MEDIUM $\lambda pc$

OPTICAL FILTER
TRANSMISSIVITY

WAVELENGTH

SIGNAL
LIGHT C

WAVELENGTH-
CONVERTED
LIGHT CV

OUTPUT FROM SECOND NONLINEAR OPTICAL MEDIUM

WAVELENGTH

SIGNAL
LIGHT C

WAVELENGTH-
CONVERTED
LIGHT CV

NONLINEAR FIBER OUTPUT
(RAMAN GAIN 14dB)

SOLID LINE: W/O RAMAN
DOTTED LINE: W/ RAMAN

OSNR:
Signal: 57 dB (W/O RAMAN)
　　　　 55 dB (W/ RAMAN)
Idler:　 54 dB (W/O RAMAN)
　　　　 50 dB (W/ RAMAN)

POST-AMPLIFIER
(NF 4dB) OUTPUT

SOLID LINE: W/O RAMAN
DOTTED LINE: W/ RAMAN

OSNR:
33 dB (W/O RAMAN)
47 dB (W/ RAMAN)

Figure 11:
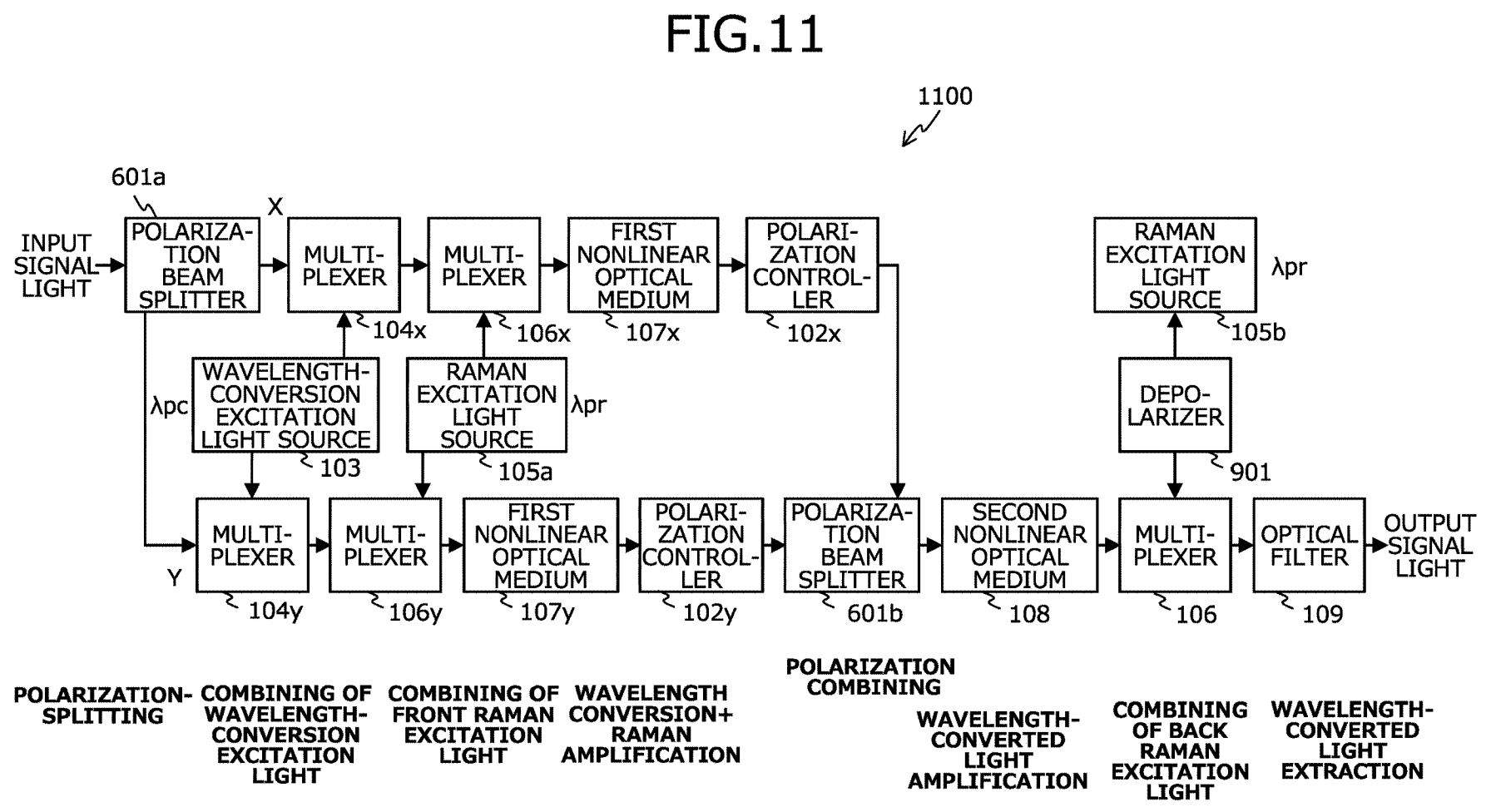

INPUT SIGNAL LIGHT

601a POLARIZATION-BEAM SPLITTER

X

MULTIPLEXER 104x

MULTIPLEXER 106x

FIRST NONLINEAR OPTICAL MEDIUM 107x

POLARIZATION CONTROLLER 102x

WAVELENGTH-CONVERSION EXCITATION LIGHT SOURCE 103  λpc

RAMAN EXCITATION LIGHT SOURCE 105a  λpr

Y MULTIPLEXER 104y

MULTIPLEXER 106y

FIRST NONLINEAR OPTICAL MEDIUM 107y

POLARIZATION CONTROLLER 102y

POLARIZATION-BEAM SPLITTER 601b

SECOND NONLINEAR OPTICAL MEDIUM 108

RAMAN EXCITATION LIGHT SOURCE 105b  λpr

DEPO-LARIZER 901

MULTIPLEXER 106

OPTICAL FILTER 109

OUTPUT SIGNAL LIGHT

POLARIZATION-SPLITTING

COMBINING OF WAVELENGTH-CONVERSION EXCITATION LIGHT

COMBINING OF FRONT RAMAN EXCITATION LIGHT

WAVELENGTH CONVERSION+ RAMAN AMPLIFICATION

POLARIZATION COMBINING

WAVELENGTH-CONVERTED LIGHT AMPLIFICATION

COMBINING OF BACK RAMAN EXCITATION LIGHT

WAVELENGTH-CONVERTED LIGHT EXTRACTION

Figure 12:
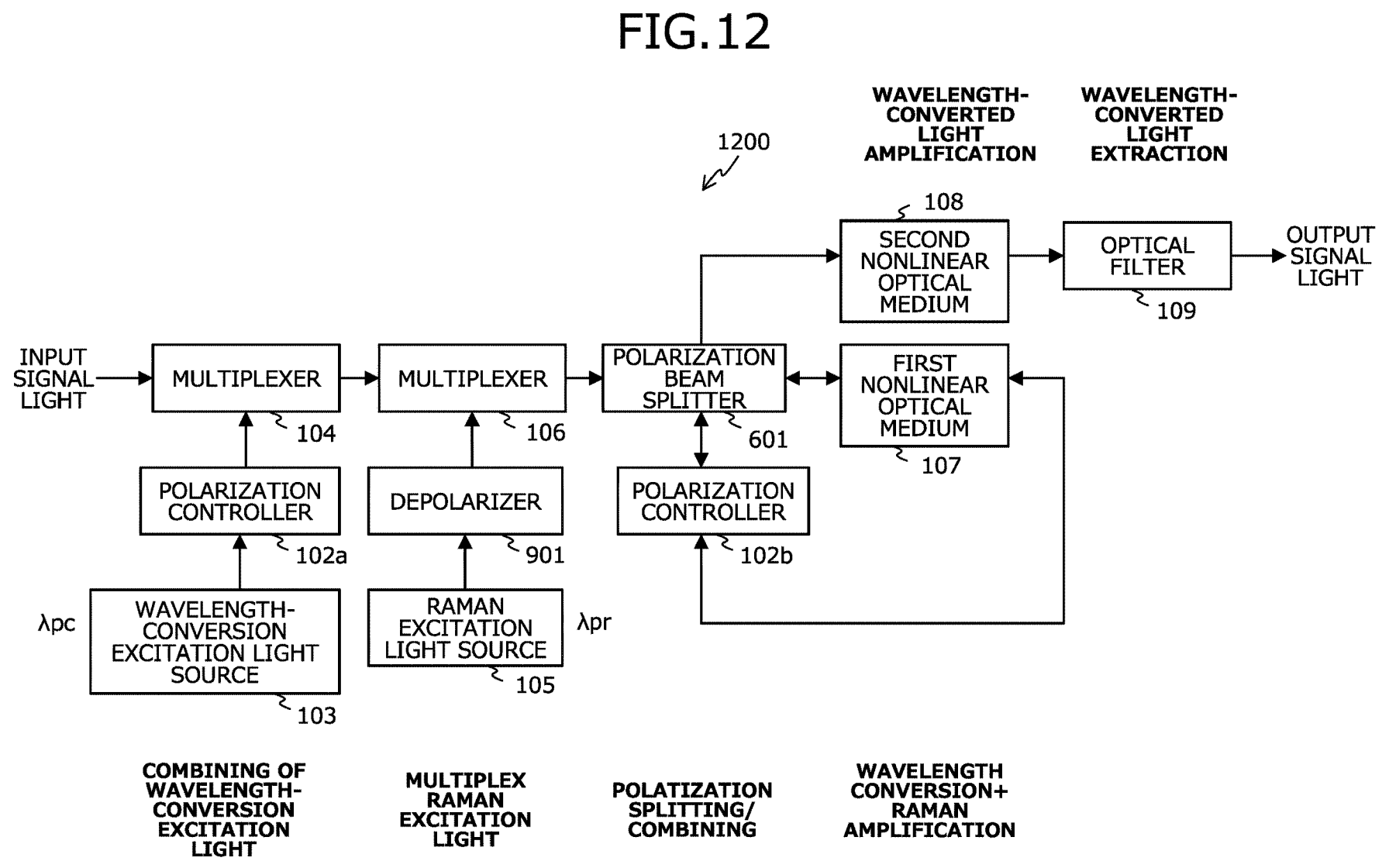

INPUT SIGNAL LIGHT → MULTIPLEXER ~104 → MULTIPLEXER ~106 → POLARIZATION BEAM SPLITTER ~601

POLARIZATION CONTROLLER ~102a ← WAVELENGTH-CONVERSION EXCITATION LIGHT SOURCE ~103    λpc

COMBINING OF WAVELENGTH-CONVERSION EXCITATION LIGHT

DEPOLARIZER ~901 ← RAMAN EXCITATION LIGHT SOURCE ~105    λpr

MULTIPLEX RAMAN EXCITATION LIGHT

POLARIZATION CONTROLLER ~102b

POLATIZATION SPLITTING/COMBINING

FIRST NONLINEAR OPTICAL MEDIUM ~107

WAVELENGTH CONVERSION+ RAMAN AMPLIFICATION

SECOND NONLINEAR OPTICAL MEDIUM ~108

WAVELENGTH-CONVERTED LIGHT AMPLIFICATION

OPTICAL FILTER ~109 → OUTPUT SIGNAL LIGHT

WAVELENGTH-CONVERTED LIGHT EXTRACTION

FIG.15

1500

INPUT SIGNAL LIGHT → POLARIZA-TION BEAM SPLITTER 601a

X

MULTI-PLEXER 104x → MULTI-PLEXER 106x → FIRST NONLINEAR OPTICAL MEDIUM 107x → POLARIZA-TION CONTROL-LER 102x

WAVELENGTH-CONVERSION EXCITATION LIGHT SOURCE 103 λpc

RAMAN EXCITATION LIGHT SOURCE 105 λpr

Y

MULTI-PLEXER 104y → MULTI-PLEXER 106y → FIRST NONLINEAR OPTICAL MEDIUM 107y → POLARIZA-TION CONTROL-LER 102y

POLARIZA-TION BEAM SPLITTER 601b → OPTICAL FILTER 310 → SECOND NONLINEAR OPTICAL MEDIUM 108 → OPTICAL FILTER 109 → OUTPUT SIGNAL LIGHT

POLARIZATION-SPLITTING

COMBINING OF WAVELENGTH-CONVERSION EXCITATION LIGHT

COMBINING OF FRONT RAMAN EXCITATION LIGHT

WAVELENGTH CONVERSION+ RAMAN AMPLIFICATION

POLARIZATION COMBINING

BLOCK WAVELENGTH-CONVERSION EXCITATION LIGHT

WAVELENGTH-CONVERTED LIGHT AMPLIFICATION

WAVELENGTH-CONVERTED LIGHT EXTRACTION

1

WAVELENGTH CONVERTER AND OPTICAL TRANSMISSION SYSTEM

CROSS REFERENCE TO RELATED APPLICATIONS

This application is based upon and claims the benefit of priority of the prior Japanese Patent Application No. 2022-151925, filed on Sep. 22, 2022, the entire contents of which are incorporated herein by reference.

FIELD OF THE INVENTION

The embodiments discussed herein related to a wavelength converter and an optical transmission system.

BACKGROUND OF THE INVENTION

To increase optical network traffic, research on wavelength conversion technology is underway, for example, to increase the number of wavelength-division multiplexing channels to expand transmission capacity. Expansion of the transmission capacity may be implemented by increasing the number of wavelength-division multiplexing channels. In expanding the transmission capacity, common optical transmitters/receivers, optical amplifiers, etc., may be utilized by transmitting signal light wavelength-converted by a wavelength converter without using optical components for individual bands.

An example of a prior art is a technique of performing wideband wavelength conversion by offsetting the problem of lowered conversion efficiency due to degenerate four-wave mixing by the optical parametric amplification effect, by setting the pump light wavelength to the anomalous dispersion region of the wavelength conversion optical fiber and setting the pump light intensity to a predetermined threshold value. A technique also exists that performs wavelength conversion with higher optical output by inputting excitation light and signal light in the degenerate four-wave mixing to a dispersion-shifted optical fiber having enhanced non-linearity and supplying Raman excitation light to the dispersion-shifted optical fiber having enhanced non-linearity. A technique also exists that, for a wideband light source, expands the optical frequency by making continuous light from the semiconductor Fabry-Perot laser into pulsed light with a single mode fiber and inputting the pulsed light to a rare-earth-doped highly nonlinear fiber (see, for example, Japanese Laid-Open Patent Publication No. 2001-075136, Japanese Laid-Open Patent Publication No. 2004-163558, and Japanese Laid-Open Patent Publication No. 2006-128408).

Another technique also exists that amplifies signal light to wideband by combining Raman amplification and parametric amplification (see, for example, Min-Chen Ho, et al, "200-nm-Bandwidth Fiber Optical Amplifier Combining Parametric and Raman Gain", JOURNAL OF LIGHTWAVE TECHNOLOGY, VOL. 19, NO. 7, JULY 2001, pp. 977-981; M. A. Ummy, et al, "Extending the Gain Bandwidth of Combined Raman-Parametric Fiber Amplifiers Using Highly Nonlinear Fiber", JOURNAL OF LIGHTWAVE TECHNOLOGY, VOL. 27, NO. 5, Mar. 1, 2009, pp. 583-589; and Frederik Klejs, et al, "SNR-Improvement of Four-Wave-Mixing Wavelength Converters using Raman Amplification", 2021 European Conference on Optical Communication (ECOC), 13-16 Sep. 2021, IEEE).

SUMMARY OF THE INVENTION

According to an aspect of an embodiment, a wavelength converter includes: a first multiplexer that combines signal light input to the wavelength converter and wavelength-conversion excitation light; a second multiplexer that combines the signal light and Raman excitation light; a first nonlinear optical medium that generates wavelength-converted light of the signal light, based on a nonlinear optical effect; and a second nonlinear optical medium that amplifies the wavelength-converted light of the signal light output from the first nonlinear optical medium. A wavelength of the Raman excitation light is a wavelength within an amplification band that allows Raman amplification of the wavelength-converted light.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a configuration diagram of a seventh embodiment of the wavelength converter.

FIG. 11 is a configuration diagram of an eighth embodiment of the wavelength converter.

FIG. 12 is a configuration diagram of a ninth embodiment of the wavelength converter.

FIG. 15 is a configuration diagram of a twelfth embodiment of the wavelength converter.

DESCRIPTION OF THE INVENTION

Embodiments of a wavelength converter and an optical transmission system of the disclosure are described in detail with reference to the drawings. For example, the wavelength converter is disposed in an optical transmission device of the optical transmission system to output wavelength-converted signal light to a transmission path, for transmission to a light receiving device. For example, the wavelength converter is disposed in the light receiving device of the optical transmission system to extract wavelength-converted signal light from signal light transmitted via the transmission path.

Figure 1A:
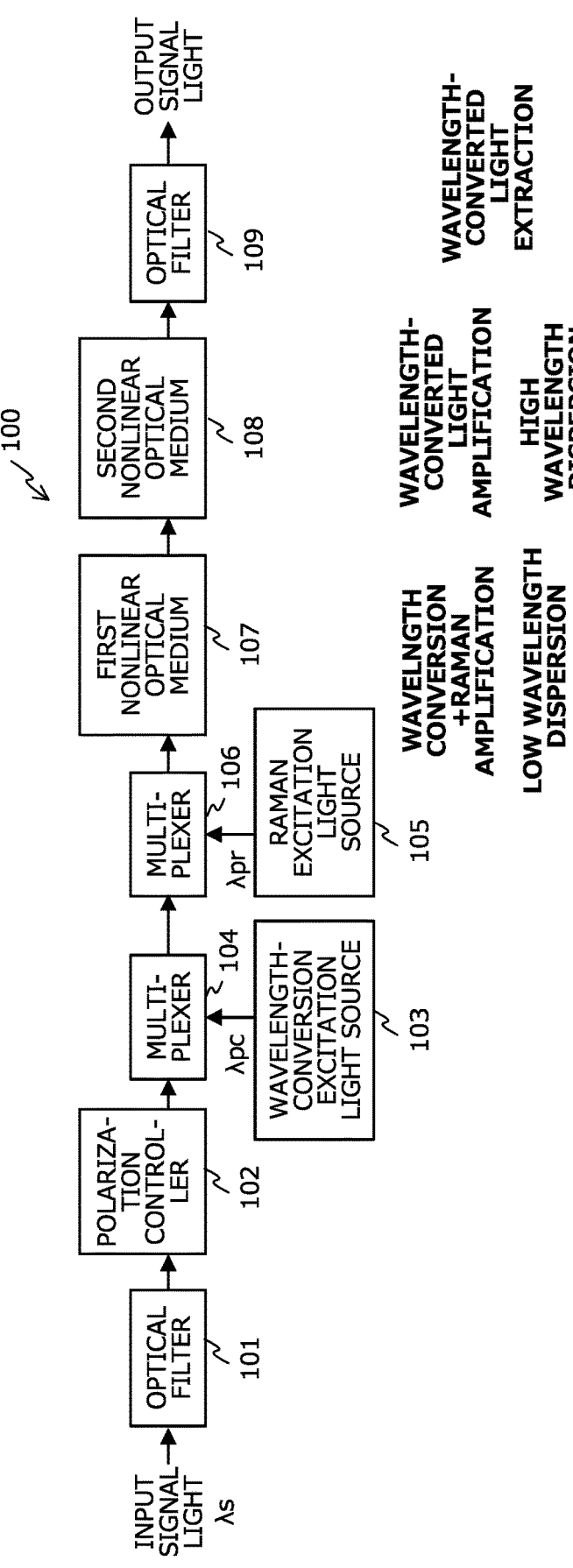
FIG. 1A is an explanatory view of a first embodiment of a wavelength converter.
Figure 1B:
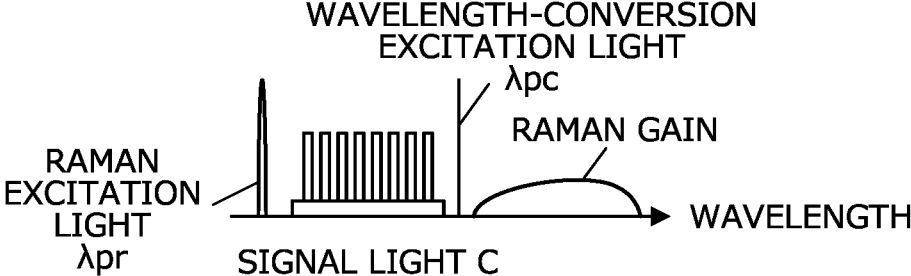
FIG. 1B is an explanatory view of the first embodiment of the wavelength converter.

FIGS. 1A and 1B are explanatory views of a first embodiment of the wavelength converter. FIG. 1A depicts a configuration example of a wavelength converter 100 disposed in the optical transmission device. The wavelength converter 100 includes an optical filter 101, a polarization controller 102, a multiplexer 104, a multiplexer 106, a first nonlinear optical medium 107, a second nonlinear optical medium 108, and an optical filter 109, which are connected in tandem in the mentioned order. The wavelength converter 100 includes a wavelength-conversion excitation light source 103 connected to the multiplexer (first multiplexer) 104 and a Raman excitation light source 105 connected to the multiplexer (second multiplexer) 106.

The optical filter 101 is a bandpass filter or the like that passes only the wavelength of input signal light (wavelength $\lambda s$). The polarization controller 102 performs polarization control of matching signal light with polarized waves of the wavelength-conversion excitation light source 103 and the Raman excitation light source 105.

The wavelength-conversion excitation light source 103 is a light source of wavelength-conversion excitation light for wavelength conversion of signal light. The wavelength-conversion excitation light with wavelength $\lambda pc$ is combined with signal light via the multiplexer 104.

The Raman excitation light source 105 is a light source of Raman excitation light for optical amplification of signal light, and Raman excitation light is combined with signal light via the multiplexer 104. Wavelength $\lambda pr$ of Raman excitation light is a wavelength within an amplification band that allows Raman amplification of wavelength-converted light.

The first nonlinear optical medium 107 is an optical medium having a nonlinear optical effect and generates wavelength-converted light (idler light) wavelength-converted from signal light by the nonlinear optical effect and Raman amplification.

The second nonlinear optical medium 108 is an optical medium having a nonlinear optical effect and optically amplifies the wavelength-converted light by Raman amplification. An absolute value of chromatic dispersion within wavelength bands of the signal light and the wavelength-converted light is greater for the second nonlinear optical medium 108 than for the first nonlinear optical medium 107. The second nonlinear optical medium 108 may have any zero-dispersion wavelength that is longer or shorter than that of the first nonlinear optical medium 107, excluding signal wavelength bands. A longer wavelength is practical in that both the high nonlinearity and the large chromatic dispersion may be easily assured.

Different types of optical media are used for the first nonlinear optical medium 107 and second nonlinear optical medium 108. The first nonlinear optical medium 107 uses a type having small chromatic dispersion in the wavelength of wavelength-converted light, while the second nonlinear optical medium 108 uses a type having large chromatic dispersion in the wavelength of wavelength-converted light. For example, the first nonlinear optical medium 107 uses a type having short physical length (interaction length) to obtain small chromatic dispersion, to suppress nonlinear noise to a low level. The second nonlinear optical medium 108 uses a long physical length type to obtain large chromatic dispersion, to allow only optical amplification without causing wavelength conversion.

The optical filter 109 is a bandpass filter or the like that passes only the wavelength of wavelength-converted light, to output signal light extracted from wavelength-converted light.

FIG. 1B depicts waveforms input to the first nonlinear optical medium 107. The wavelength $\lambda pr$ of Raman excitation light is a wavelength shorter than the wavelength band of signal light C. For example, since Raman amplification performs optical amplification at a frequency apart 13 THz in optical fiber, the wavelength $\lambda pr$ of Raman excitation light is set to a wavelength 100 nm shorter than the wavelength of wavelength-converted light CV around 1550 nm. Although here the wavelength band of the wavelength-converted light CV has a longer wavelength than that of the wavelength band of the signal light C, it may have a shorter wavelength. At the input of the first nonlinear optical medium 107 a predetermined Raman gain occurs on the wavelength side longer than the wavelength $\lambda s$ of the signal light C, due to Raman excitation of the signal light.

Figure 1C:
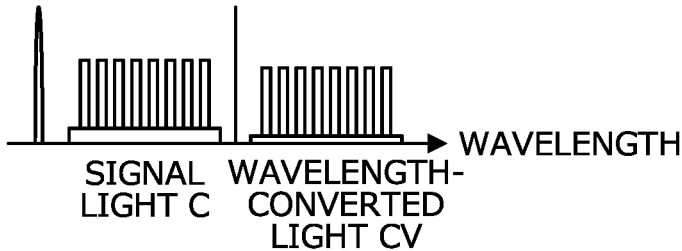
FIG. 1C is an explanatory view of the first embodiment of the wavelength converter.

FIG. 1C depicts waveforms input to the second nonlinear optical medium 108. A state is depicted where signal light C and wavelength-converted light CV that is wavelength-converted and Raman-amplified from the signal light C are input to the second nonlinear optical medium 108 by the first nonlinear optical medium 107.

Figure 1D:
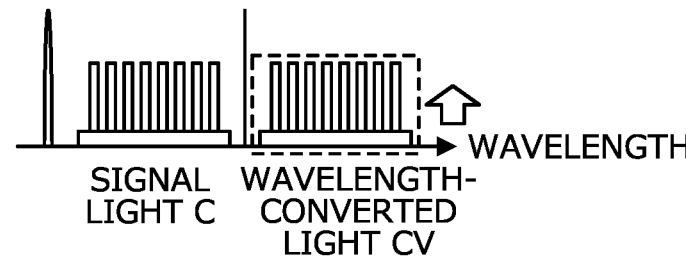
FIG. 1D is an explanatory view of the first embodiment of the wavelength converter.

FIG. 1D depicts output waveforms from the second nonlinear optical medium 108. A spectral arrangement is depicted where wavelength-converted light has been optically amplified by Raman amplification by the second nonlinear optical medium 108.

Here defect in technique of a comparative example is described. To extend the transmission distance, the optical transmitter needs to maintain high output power until input to the transmission path. In case of wavelength conversion between the optical transmitter and the transmission path, when a configuration of compensating attenuation in optical power by optical amplification after wavelength conversion is employed, the transmittable distance decreases due to an increase in noise corresponding to the amount of optical power attenuation in wavelength conversion. On the other hand, high output power may be maintained by increasing optical power before wavelength conversion or by improving the conversion efficiency, but this may cause tendency of increased nonlinear noise which occurs during wavelength conversion.

In contrast, there is a technique to increase the output power while suppressing the amount of generated noise through simultaneous execution of wavelength conversion and Raman amplification by inputting wavelength-conversion excitation light and the Raman amplification excitation light to the nonlinear optical medium (see, for example, Japanese Laid-Open Patent Publication No. 2004-163558).

Figure 2A:
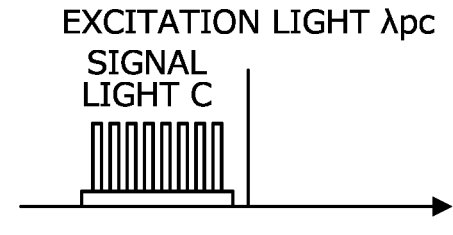
FIG. 2A is an explanatory view of defect of wavelength conversion by a technique of a comparative example.
Figure 2B:
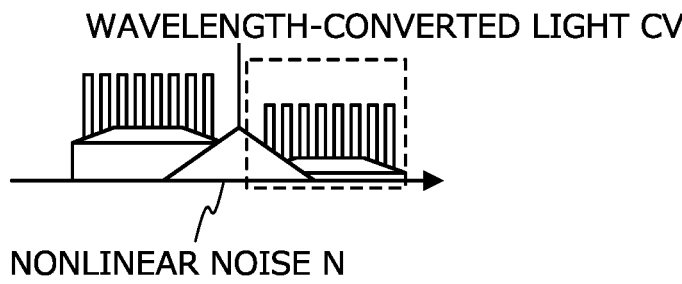
FIG. 2B is an explanatory view of defect of wavelength conversion by the technique of the comparative example.

FIGS. 2A and 2B are explanatory views of defect of wavelength conversion by the technique of the comparative example. Since short interaction length is advantageous in wavelength conversion within a wide wavelength band, the comparative example technique cannot obtain sufficient Raman gain. For example, if the interaction length is increased to enhance the Raman gain in the comparative example technique, phase matching conditions in wavelength conversion break down, resulting in a narrowed conversion band of the wavelength-converted light CV. For example, if the output power is increased for wavelength conversion of input signal light depicted in FIG. 2A, nonlinear noise N occurs as depicted in FIG. 2B and overlaps the conversion band of the wavelength-converted light CV and as a result, the effective conversion band of the wavelength-converted light CV becomes narrowed.

To deal with this, for example, in case of employing the configuration of combining such simultaneous processing of wavelength conversion and Raman amplification with another optical amplifier separate from the simultaneous processing, the number of required excitation light sources increases, bringing about increased costs.

In contrast, in the first embodiment, the second nonlinear optical medium 108 is connected downstream to the first nonlinear optical medium 107, and wavelength-conversion excitation light and Raman excitation light are input to the first nonlinear optical medium 107. Here, by using a small chromatic dispersion type as the first nonlinear optical medium 107, generated is wavelength-converted light with nonlinear noise suppressed to a low level by the nonlinear optical effect of the first nonlinear optical medium 107 and Raman amplification, which wavelength-converted light is output to the second nonlinear optical medium 108.

On the other hand, by using a large chromatic dispersion type as the second nonlinear optical medium 108, optical amplification may be performed for the conversion band of the wavelength-converted light CV without inducing wavelength conversion.

A dispersion characteristic example of the nonlinear optical medium is shown. For example, for phase matching among wavelength-conversion excitation light, input signal light C, and wavelength-converted light CV, the first nonlinear optical medium 107 has a chromatic dispersion absolute value within the wavelength range, as small as less than 3 ps/nm/km, with the zero-dispersion wavelength being a wavelength between the input signal light C and wavelength-converted light CV.

The second nonlinear optical medium 108 suppresses nonlinear distortion within the input signal light and the interaction on the wavelength-converted light CV by wavelength-conversion excitation light. For this reason, the second nonlinear optical medium 108 has a chromatic dispersion absolute value within the wavelength ranges of signal light C and wavelength-converted light CV, as large as 3 ps/nm/km or more, with the zero-dispersion wavelength being a wavelength longer than that of the first nonlinear optical medium 107.

Figure 3A:
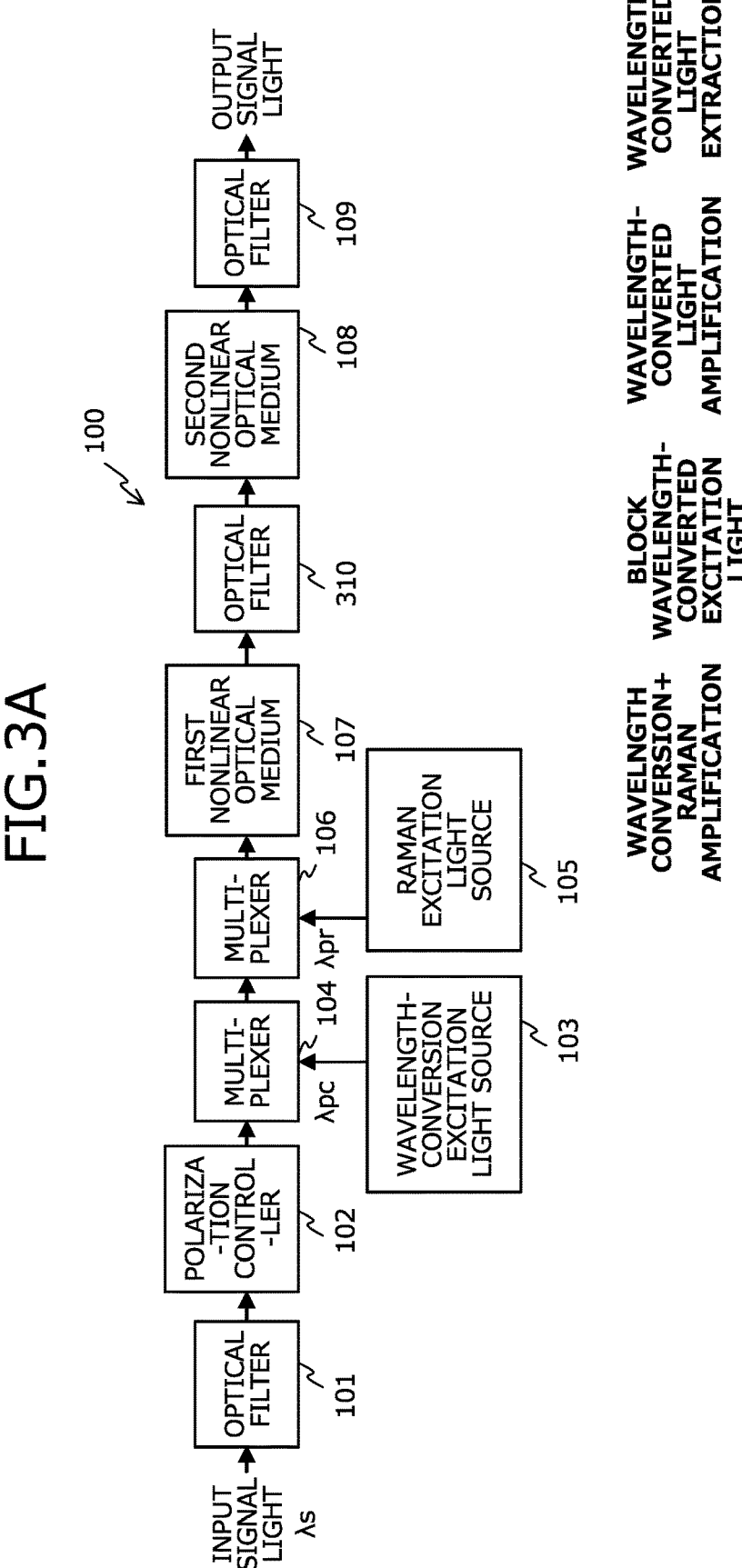
FIG. 3A is an explanatory view of a second embodiment of the wavelength converter.

FIGS. 3A, 3B, 3C, and 3D are explanatory views of a second embodiment of the wavelength converter. FIG. 3A depicts a configuration example of the wavelength converter 100 disposed in the optical transmission device, in which the same reference numerals are imparted to the same configuration units as in the first embodiment depicted in FIG. 1A.

The wavelength converter 100 includes the optical filter 101, the polarization controller 102, the multiplexer 104, the multiplexer 106, the first nonlinear optical medium 107, the second nonlinear optical medium 108, and the optical filter 109, which are connected in tandem in the mentioned order. The wavelength converter 100 includes the wavelength-conversion excitation light source 103 connected to the multiplexer 104, and the Raman excitation light source 105 connected to the multiplexer 106. In the second embodiment, an optical filter 310 is disposed between the first nonlinear optical medium 107 and the second nonlinear optical medium 108.

The optical filter 310 is a filter, for example, bandpass filter, that rejects input of wavelength-conversion excitation light $\lambda$pc to the second nonlinear optical medium 108.

Figure 3B:
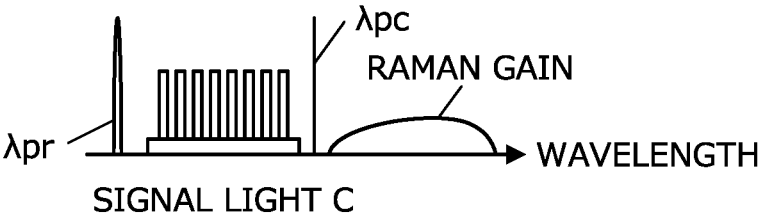
FIG. 3B is an explanatory view of the second embodiment of the wavelength converter.

FIG. 3B depicts waveforms input to the first nonlinear optical medium 107. The wavelength $\lambda$pr of Raman excitation light is a wavelength shorter than the wavelength band of signal light C. For example, since Raman amplification performs optical amplification at a frequency apart 13 THz in optical fiber, the wavelength $\lambda$pr of Raman excitation light is set to a wavelength shorter 100 nm than the wavelength of wavelength-converted light CV in the vicinity of 1550 nm. Although here the wavelength band of the wavelength-converted light CV has a longer wavelength than the wavelength band of the signal light C, it may have shorter wavelength. At the input of the first nonlinear optical medium 107 a predetermined Raman gain occurs on the wavelength side longer than the wavelength $\lambda$s of the signal light C, due to Raman excitation of the signal light.

Figure 3C:
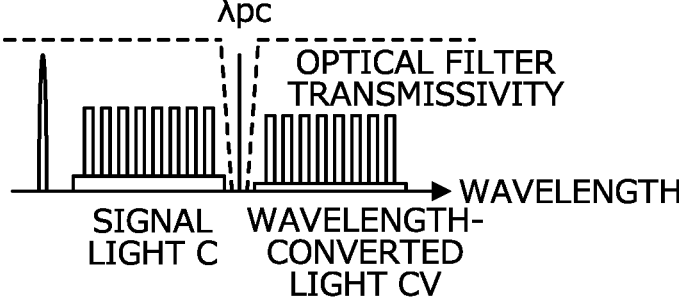
FIG. 3C is an explanatory view of the second embodiment of the wavelength converter.

FIG. 3C depicts waveforms input to the second nonlinear optical medium 108. A spectral arrangement is depicted where signal light C and wavelength-converted light CV that is wavelength-converted and Raman-amplified from the signal light C are input to the second nonlinear optical medium 108 by the first nonlinear optical medium 107. Here, optical filter 310 has an optical filter transmission characteristic that rejects (cuts) passage of the band of the wavelength-conversion excitation light $\lambda$pc, to pass the signal light C and the wavelength-converted light CV in the bands on both sides thereof, for the input to the second nonlinear optical medium 108.

Figure 3D:
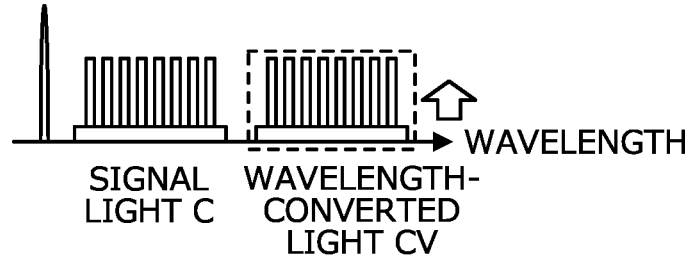
FIG. 3D is an explanatory view of the second embodiment of the wavelength converter.

FIG. 3D depicts output waveforms from the second nonlinear optical medium 108. A spectral arrangement is depicted where wavelength-converted light has been optically amplified by Raman amplification by the second nonlinear optical medium 108.

In the configuration of the second embodiment, disposition of the optical filter 310 enables use of the first nonlinear optical medium 107 and the second nonlinear optical medium 108 that have the same dispersion characteristic. By disposing the optical filter 310 between the first nonlinear optical medium 107 and the second nonlinear optical medium 108, wavelength-conversion excitation light $\lambda$pc cannot enter the second nonlinear optical medium 108 to allow Raman amplification by Raman excitation light $\lambda$pr.

In the first embodiment and the second embodiment described hereinabove, wavelength conversion is performed while amplifying in the first nonlinear optical medium 107, and optical amplification is performed by the same Raman excitation light in the second nonlinear optical medium 108 connected downstream to the first nonlinear optical medium 107. This enables high output optical power to be achieved while suppressing the amount of generated noise.

The configuration has been employed where the wavelength-conversion excitation light λpc and the Raman excitation light λpr are input to the first nonlinear optical medium 107 and the second nonlinear optical medium 108. By such a configuration of sharing the excitation lights between simultaneous amplification with wavelength conversion and optical amplification at the downstream stage, reduced cost may be achieved as compared with a case of individually preparing the light sources.

Here, as in the first embodiment, the configuration is employed where a small chromatic dispersion type is used as the first nonlinear optical medium 107 while a large chromatic dispersion type is used as the second nonlinear optical medium 108. As in the second embodiment, the configuration may be such that the optical filter 310 is disposed for rejecting the wavelength-conversion excitation light λpc at the stage upstream to the second nonlinear optical medium 108. According to the first and second embodiments, high output optical power may be achieved while suppressing the amount of generated noise.

The nonlinear optical medium may be, for example, an optical fiber or a planar optical waveguide. In case of an optical fiber, a type that combines excitation light and signal light together for input used is, to thereby generate wavelength-converted light of a different wavelength from that of the signal light, by four wave mixing (or difference frequency generation) due to third (or second)-order nonlinear polarization. For example, an optical fiber with high nonlinearity may be used that has a small core cross-sectional area or contains a dopant with high nonlinear refractive index.

The planar optical waveguide may be one having a core made of, for example, silicon or compound semiconductor that is a dielectric with a high relative refractive index difference and a high nonlinear refractive index. The planar optical waveguide may be, for example, one using an optical crystal such as periodically poled lithium niobate with high second-order nonlinear polarization.

Figure 4A:
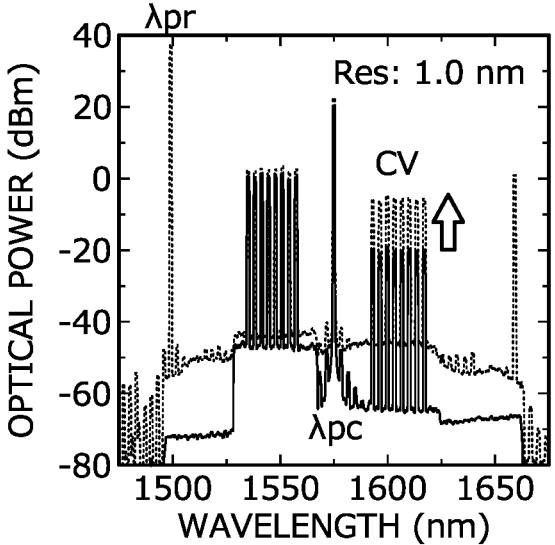
FIG. 4A is a graph of wavelength conversion simulation of the second embodiment.
Figure 4B:
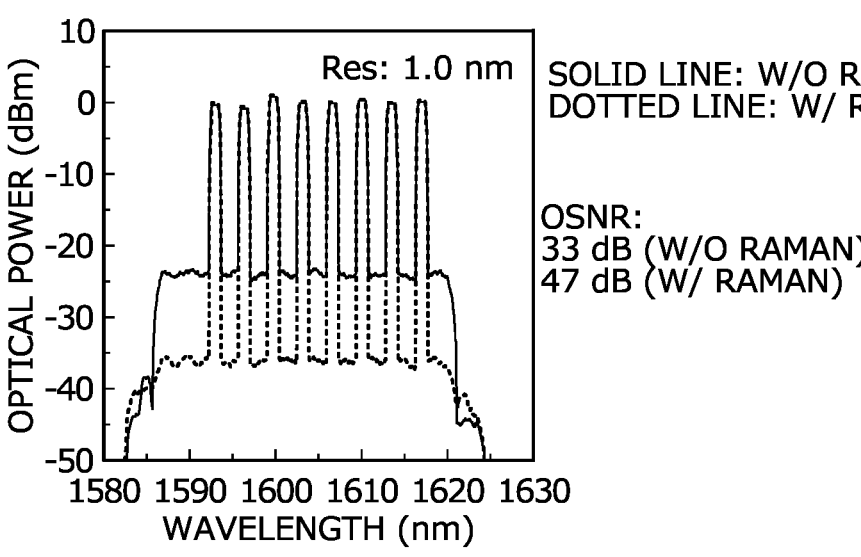
FIG. 4B is a graph of wavelength conversion simulation of the second embodiment.

FIGS. 4A and 4B are graphs of wavelength conversion simulation of the second embodiment. In the example of FIGS. 4A and 4B, the wavelength-conversion excitation light λpc has a wavelength of 1575 nm and a level of 20 dBm. The signal light has a wavelength in range of 1530 to 1560 nm and a level of 0 dBm. The Raman excitation light λpr has a wavelength of 1499 nm and a level of 37 dBm. The nonlinear fiber has a zero-dispersion wavelength λo=1575 nm, an effective cross-sectional area λeff=20 μm², and a length of 200 m.

FIG. 4A is a graph depicting output of the first nonlinear optical medium 107 (nonlinear fiber), while FIG. 4B is a graph depicting output of the second nonlinear optical medium 108 (post-amplifier). In these graphs, the horizontal axis represents wavelength and the vertical axis represents optical power.

In FIGS. 4A and 4B, solid lines indicate waveforms when no Raman excitation light is input to the first nonlinear optical medium 107 (nonlinear fiber), while dotted lines indicate waveforms when Raman excitation light is input to the first nonlinear optical medium 107 (nonlinear fiber).

As indicated by dotted lines in FIG. 4A, the output power of the wavelength-converted light CV is increased (Raman gain 14 dB) by the amount indicated by an arrow, by Raman excitation light. Optical signal-to-noise ratio (OSNR) was 57 dB in signal light Signal and 54 dB in wavelength-converted light Idler without Raman excitation light, while it was 55 dB in Signal and 50 dB in Idler with Raman excitation light.

In the output of the second nonlinear optical medium 108 (post-amplifier; noise figure (NF):4 dB) in FIG. 4B, OSNR without Raman excitation light indicated by solid lines is 33 dB. On the other hand, OSNR with Raman excitation light indicated by dotted lines (second embodiment) was improved to 47 dB.

The above simulation results are discussed. The noise increase (comparison between signal light C and wavelength-converted light CV) in wavelength-converted light CV by wavelength conversion depicted in FIG. 4A was 3 dB (theoretical noise increase of a loss-less optical amplifier; invisible when the post-amplifier is disposed, due to low conversion efficiency). Simultaneous execution of Raman amplification caused deterioration of 2 dB in signal light C due to spontaneous emission Raman scattering (Raman excitation condition-dependent).

Then, in the case of execution of Raman amplification, OSNR deteriorated by 7 dB as compared with the input signal of the wavelength-converted light CV (spontaneous emission Raman:2 dBx2+optical amplifier theoretical noise increase:3 dB).

In the case of conversion efficiency of −20 dB, the noise increase in the downstream-stage loss compensation optical amplification (second nonlinear optical medium 108) without Raman amplification is 24 dB in total of 20 dB loss and NF of the optical amplifier. On the other hand, the noise increase in the downstream-stage loss compensation optical amplification (second nonlinear optical medium 108) with Raman amplification was suppressed to 10 dB or less, coincident with the amplification increase in a two-stage amplifier (upstream-stage NF:7 dB, gain G:−6 dB; downstream-stage NF:4 dB, gain G:6 dB).

Figure 5:
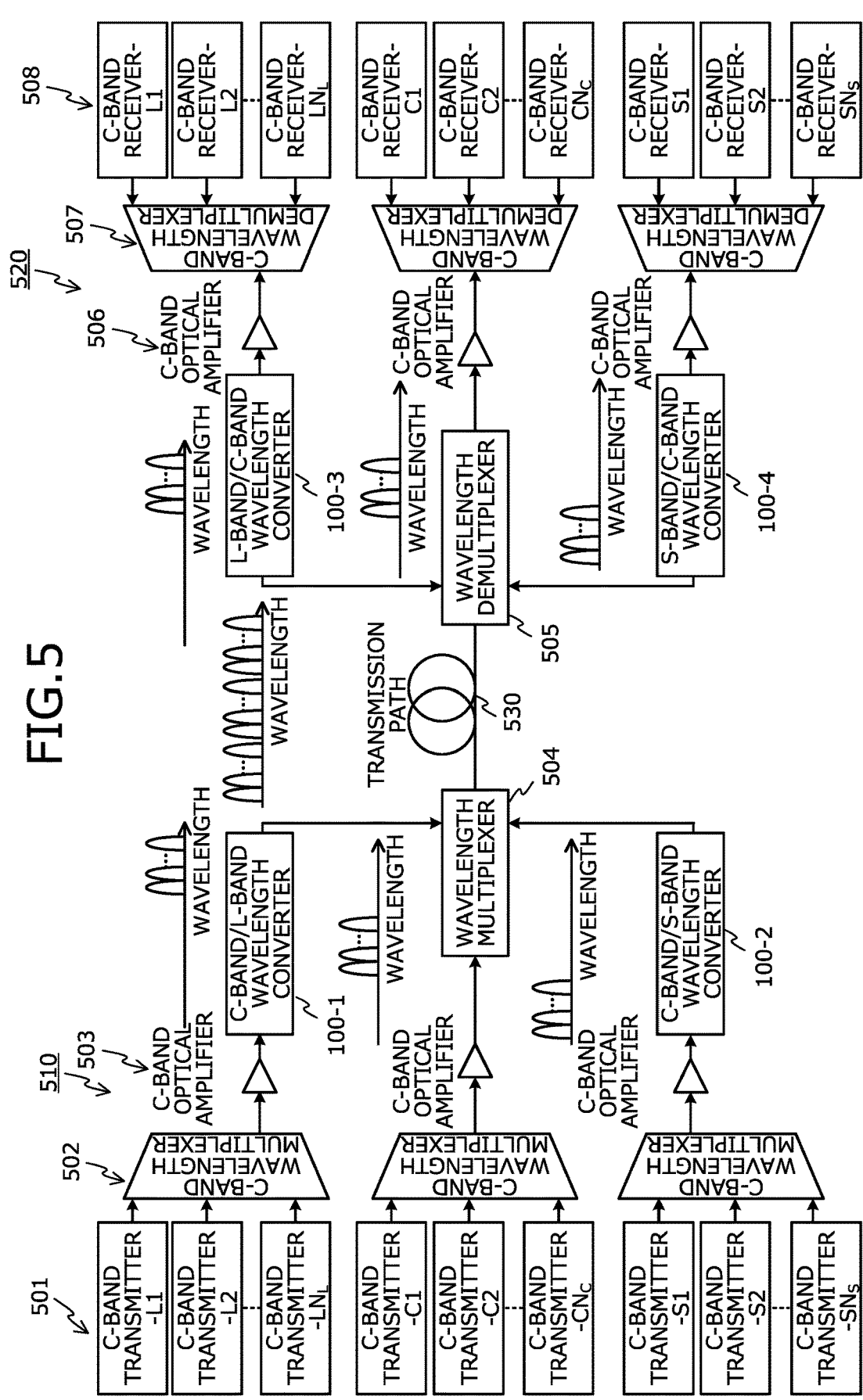
FIG. 5 is a diagram depicting a configuration example of an optical transmission system.

FIG. 5 is a diagram depicting a configuration example of the optical transmission system. FIG. 5 depicts an example in which the wavelength converter 100 of the above first embodiment (FIG. 1) and second embodiment (FIG. 3) is applied to an optical transmission system having plural bands. The wavelength converter 100 is arranged in each of a transmitting device 510 and a receiving device 520, to transmit signal light via a transmission path 530.

In the example of FIG. 5, the transmitting device 510 and the receiving device 520 transmit signal light in three different wavelength bands, for example, L-band, C-band, and S-band of wavelength division multiplexing (WDM). The transmitting device 510 includes C-band transmitters 501, C-band wavelength multiplexers 502, C-band optical amplifiers 503, and a wavelength multiplexer 504. The transmitters 501 convert an input electrical signal into signal light of C-band wavelength (first wavelength band), for output.

The transmitting device 510 includes a wavelength converter 100-1 that converts C-band signal light into L-band (second wavelength band) signal light, and a wavelength converter 100-2 that converts C-band signal light into S-band (third wavelength band) signal light.

The receiving device 520 includes a wavelength demultiplexer 505, C-band optical amplifiers 506, C-band wavelength demultiplexers 507, and C-band receivers 508. The receivers 508 convert input signal light of C-band wavelength into electrical signal, for output.

The receiving device 520 includes a wavelength converter 100-3 that converts L-band signal light into C-band signal light, and a wavelength converter 100-4 that converts S-band signal light into C-band signal light.

The configuration described in the first embodiment (FIG. 1) or the second embodiment (FIG. 3) is applicable intactly to the wavelength converters 100-1 and 100-2 disposed in the transmitting device 510. The configuration reversing the input/output order in the configuration described in the first embodiment (FIG. 1) or the second embodiment (FIG. 3) is applicable to the wavelength converters 100-3 and 100-4 disposed in the receiving device 520.

According to this optical transmission system, the transmitting device 510 and the receiving device 520 may increase the number of wavelength-division multiplexing channels in WDM to expand the transmission capacity, by using the transmitters 501 and the receivers 508, respectively. Then, the wavelength converters 100 (100-1 to 100-4) are disposed respectively in the transmitting device 510 and the receiving device 520 to convert the wavelength of signal light.

This achieves a low-cost configuration by using optical components within a common wavelength band (C-band) as the transmitters 501, the receivers 508, the optical amplifiers 503 and 506, the wavelength multiplexers 502, and the wavelength demultiplexer 507 included in the transmitting device 510 and the receiving device 520.

Embodiments of a wavelength converter compatible with polarization multiplexing (polarization diversity) are described. Although the wavelength converter 100 of the above first embodiment converts the wavelength of signal light of a single polarized wave, the wavelength converter of the following embodiments handles polarization multiplexing signals.

Third to tenth embodiments depicted in FIGS. 6 to 13 are compatible with polarization multiplexing and have a fundamental configuration of the wavelength converter 100 (without the optical filter 310) that uses the first nonlinear optical medium 107 and the second nonlinear optical medium 108 each having a different chromatic dispersion characteristic, described in the first embodiment (FIG. 1).

Figure 6:
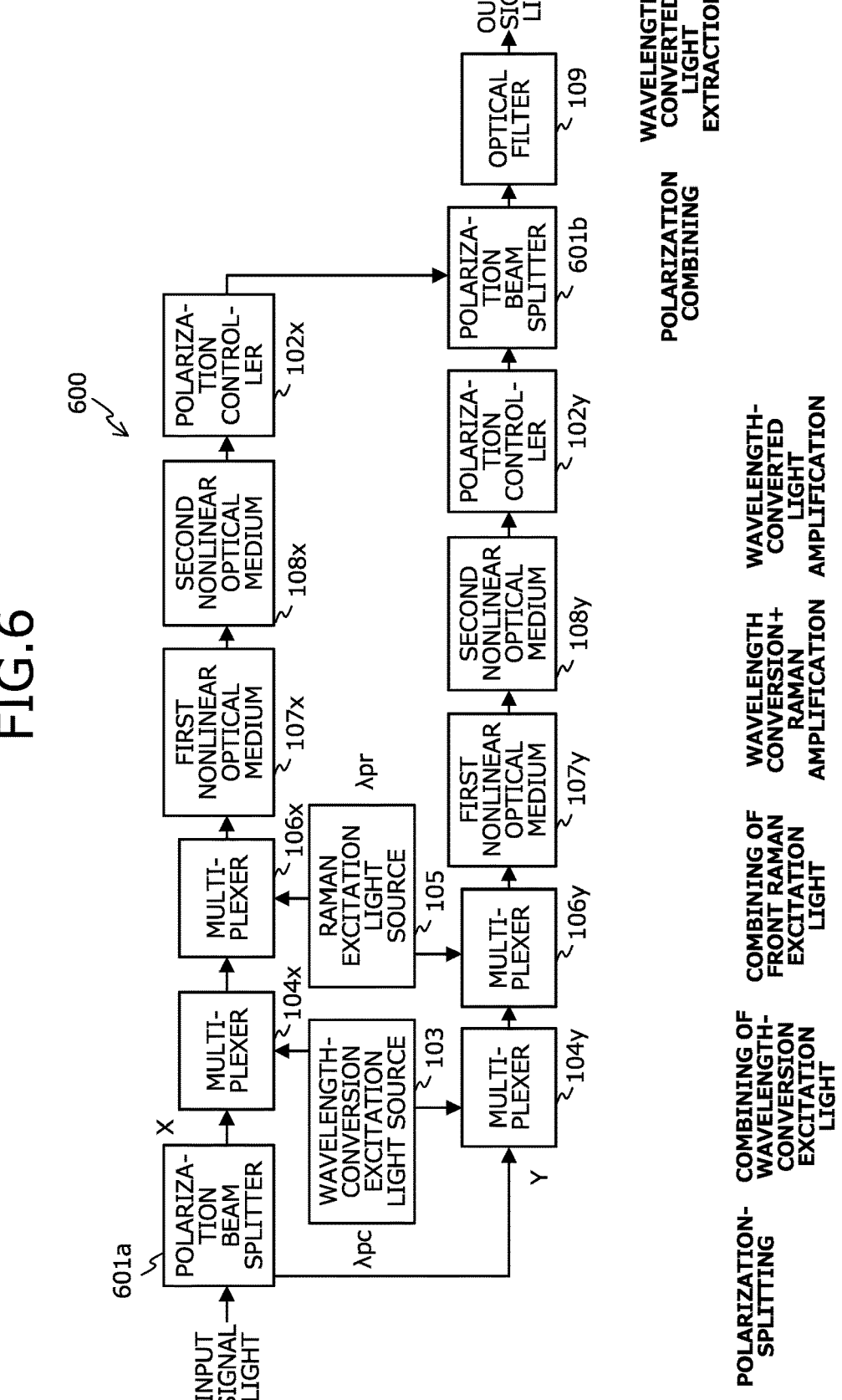
FIG. 6 is a configuration diagram of a third embodiment of the wavelength converter.

FIG. 6 is a configuration diagram of the third embodiment of the wavelength converter. In FIG. 6, the same reference numerals are imparted to the same configuration units as those of the first embodiment (FIG. 1). Polarization-multiplexed signal light input to a wavelength converter 600 depicted in FIG. 6 is polarization-split by a polarization beam splitter (first polarization beam splitter) 601a. The polarization controller 600 includes the multiplexer 106, the first nonlinear optical medium 107, the second nonlinear optical medium 108, and the polarization controller 102, which are arranged in each of an x-polarization series and a Y-polarization series after polarization-splitting.

The X-polarization series is described. Wavelength-conversion excitation light from the wavelength-conversion excitation light source 103 is combined with signal light by a multiplexer 104x. Raman excitation light from the Raman excitation light source 105 is combined with signal light by a multiplexer 106x, for forward Raman excitation. Following the multiplexer 106x, connected are a first nonlinear optical medium 107x, a second nonlinear optical medium 108x, and a polarization controller 102x. The first nonlinear optical medium 107x performs wavelength conversion and Raman amplification of signal light. The second nonlinear optical medium 108x amplifies wavelength-converted light.

The description on the X-polarization series applies to the Y-polarization series. Wavelength-conversion excitation light from the wavelength-conversion excitation light source 103 is combined with signal light by a multiplexer 104y. Raman excitation light from the Raman excitation light source 105 is combined with signal light by a multiplexer 106y, for forward Raman excitation. Connected following the multiplexer 106y are a first nonlinear optical medium 107y, a second nonlinear optical medium 108y, and a polarization controller 102y. The first nonlinear optical medium 107y performs wavelength conversion and Raman amplification of signal light. The second nonlinear optical medium 108y amplifies wavelength-converted light.

Outputs of the polarization controllers 102x and 102y are provided to a polarization beam splitter 601b (second polarization beam splitter). The polarization beam splitter 601b performs polarization-combining of an X-polarized wave and a Y-polarized wave, for output to the optical filter 109. The optical filter 109 extracts wavelength-converted light, to output the extracted light as signal light.

Figure 7:
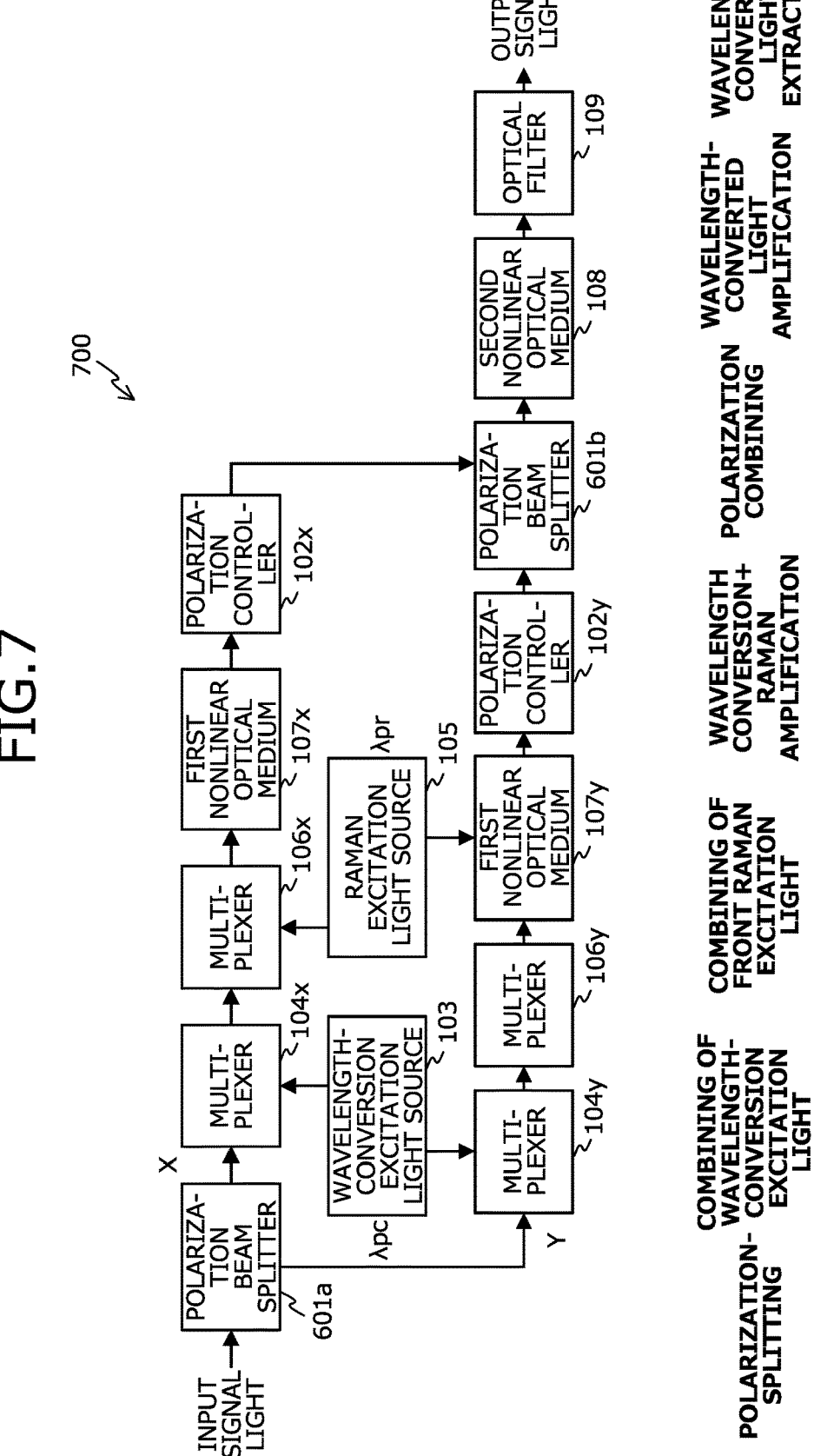
FIG. 7 is a configuration diagram of a fourth embodiment of the wavelength converter.

FIG. 7 is a configuration diagram of the fourth embodiment of the wavelength converter. A wavelength converter 700 of the fourth embodiment differs from the wavelength converter 600 of the third embodiment (FIG. 6) in that the second nonlinear optical medium 108 is arranged downstream to the polarization beam splitter 601b.

The wavelength converter 700 of the fourth embodiment has a function effect of the third embodiment, and may reduce the number of the optical amplification media (second nonlinear optical media 108) from the third embodiment. Although the wavelength converter 600 of the third embodiment depicted in FIG. 6 includes two second nonlinear optical media 108 as the optical amplification medium, the wavelength converter 700 of this fourth embodiment needs only to include one second nonlinear optical medium 108, which leads to a reduction in the number thereof.

Figure 8:
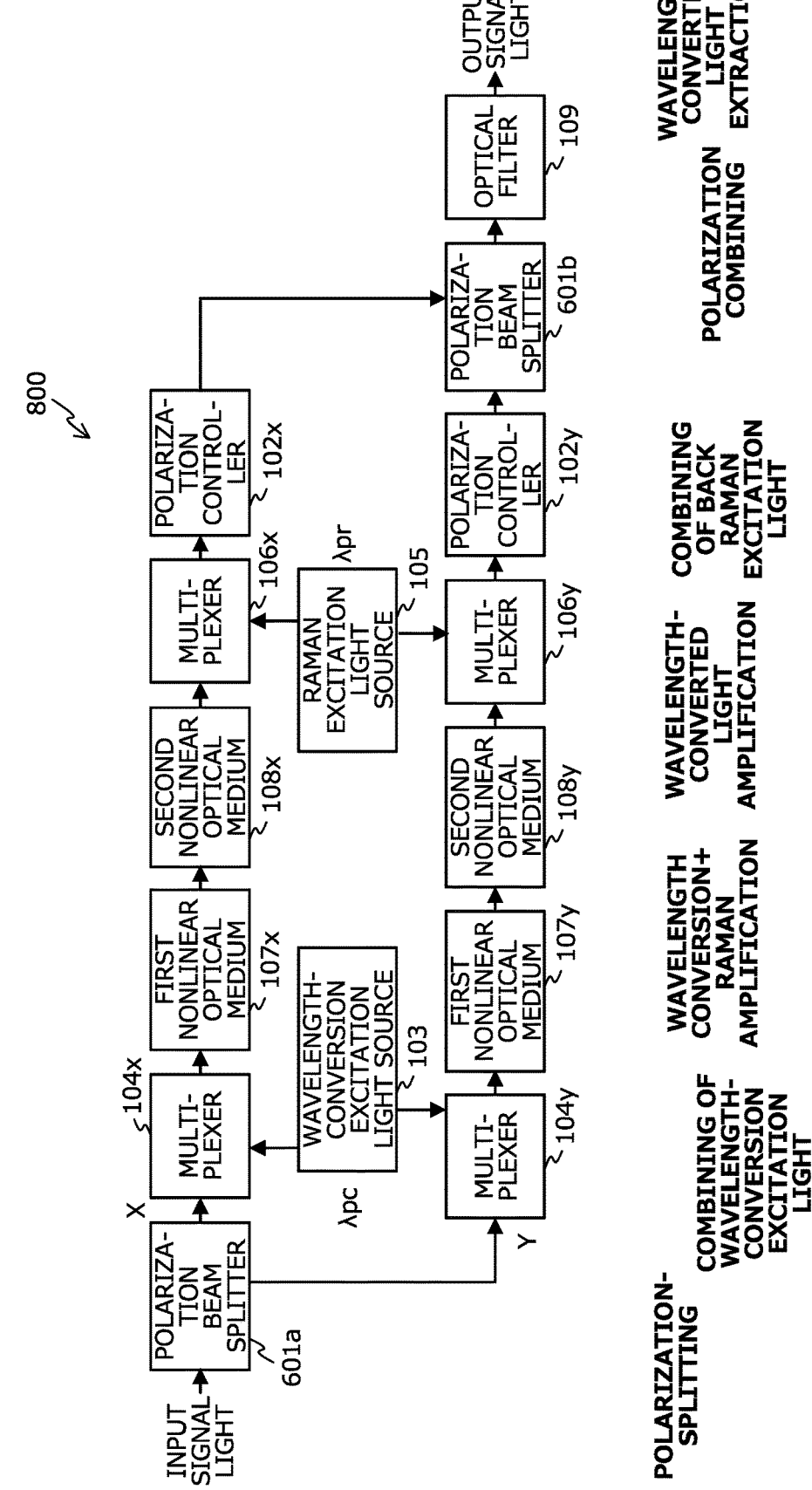
FIG. 8 is a configuration diagram of a fifth embodiment of the wavelength converter.

FIG. 8 is a configuration diagram of the fifth embodiment of the wavelength converter. A wavelength converter 800 depicted in FIG. 8 differs from the wavelength converter 600 of the third embodiment (FIG. 6) in that the Raman excitation light source 105 is arranged downstream to the second nonlinear optical medium 108, to perform backward Raman excitation.

According to the wavelength converter 800 of this fifth embodiment, the Raman amplification gain may be increased as compared with the wavelength converter 600 of the third embodiment (FIG. 6).

Figure 9:
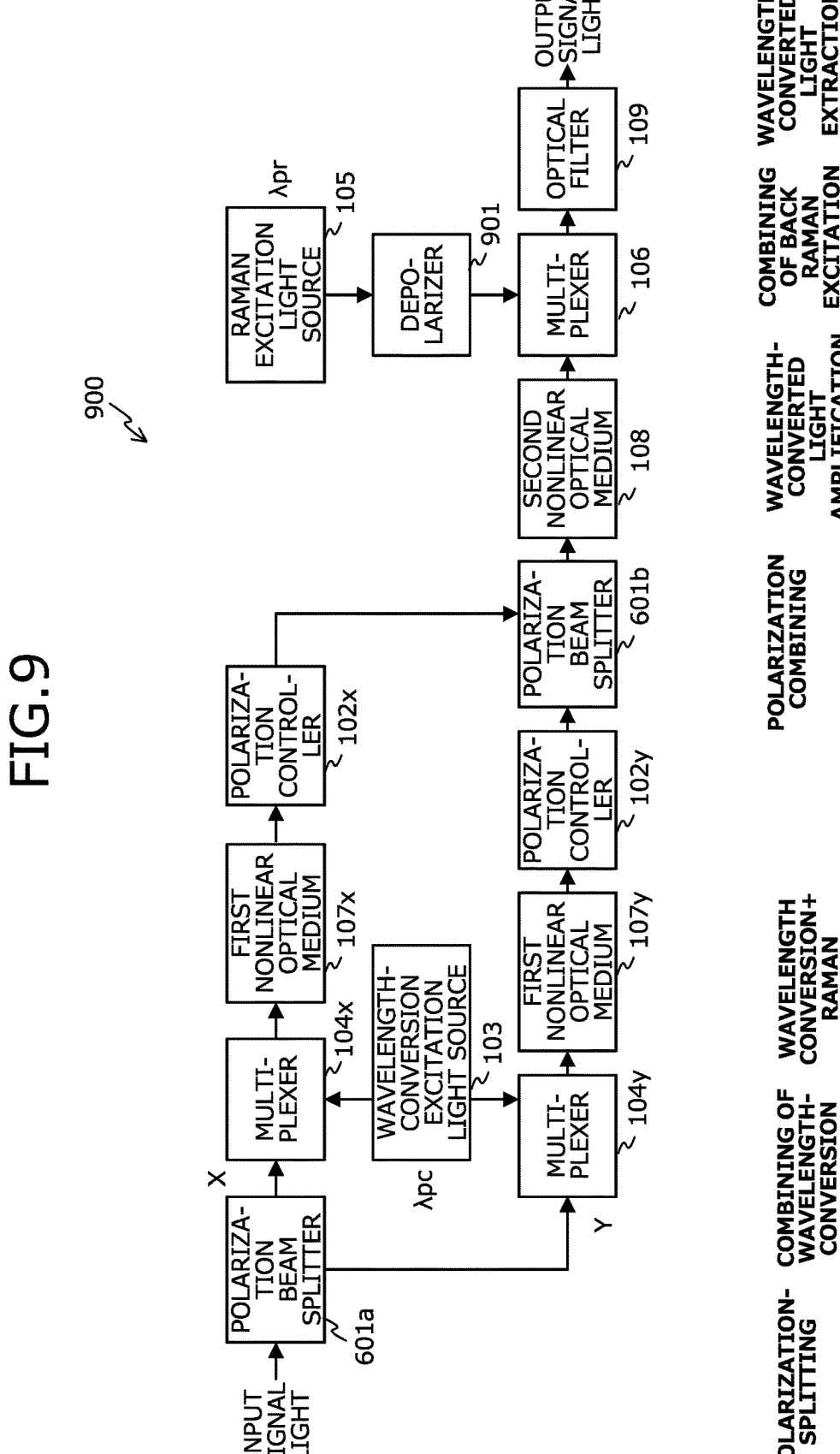
FIG. 9 is a configuration diagram of a sixth embodiment of the wavelength converter.

FIG. 9 is a configuration diagram of the sixth embodiment of the wavelength converter. A wavelength converter 900 depicted in FIG. 9 differs from the wavelength converter 800 of the fifth embodiment (FIG. 8) in that the second nonlinear optical medium 108 is arranged downstream to the polarization beam splitter 601b. The Raman excitation light source 105 performs backward Raman excitation of the second nonlinear optical medium 108 via a depolarizer 901 for conversion into non-polarized light and the multiplexer 106.

The wavelength converter 900 of the sixth embodiment has a function effect of the fifth embodiment, and may reduce the number of the second nonlinear optical media 108 as the optical amplification media, as compared with the wavelength converter 800 of the fifth embodiment (FIG. 8), since it only requires one second nonlinear optical medium 108.

Figure 10:
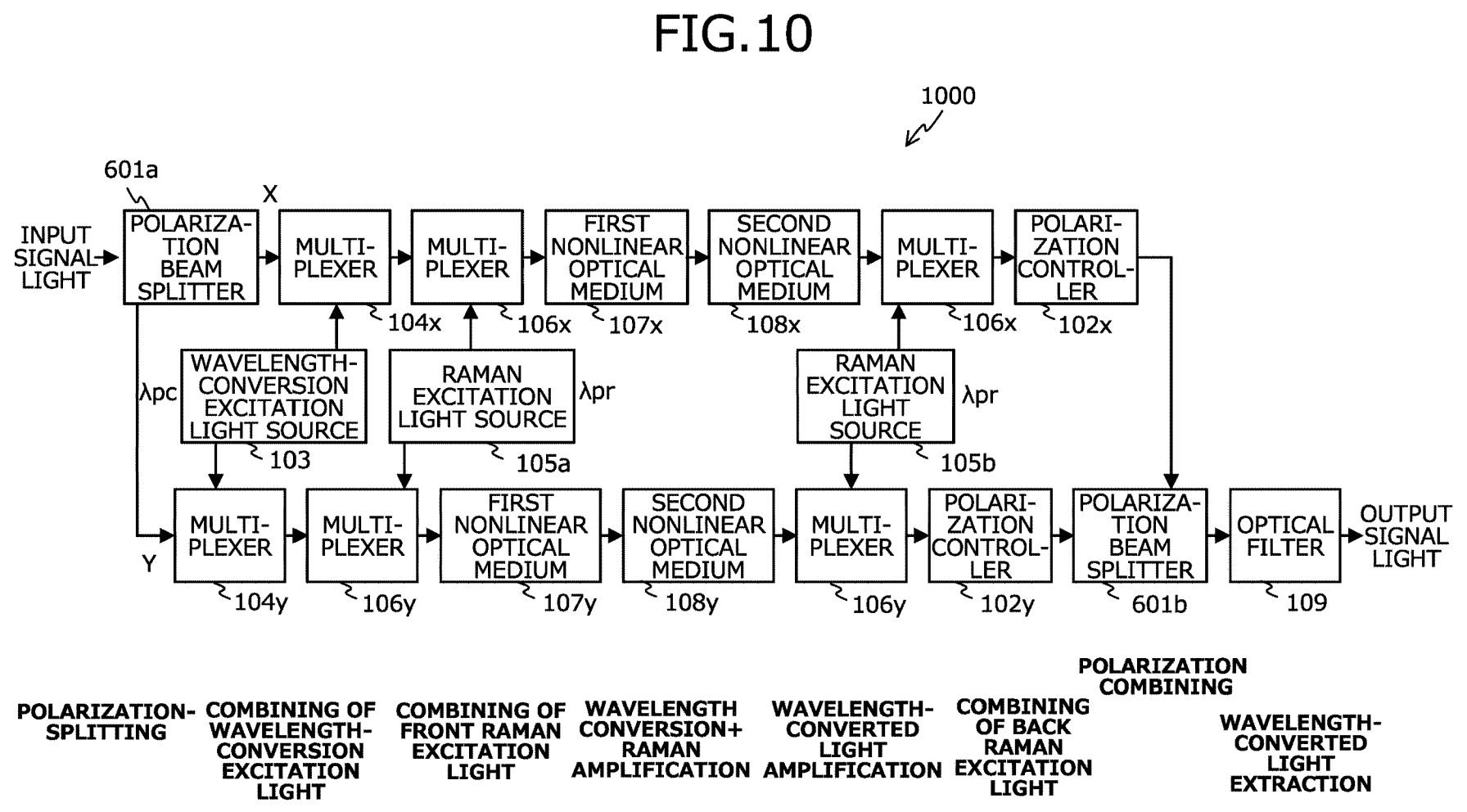

FIG. 10 is a configuration diagram of the seventh embodiment of the wavelength converter. A wavelength converter 1000 depicted in FIG. 10 differs from the wavelength converter 600 of the third embodiment (FIG. 6) in that the Raman excitation light source 105 is additionally arranged downstream to the second nonlinear optical medium 108 to perform forward Raman excitation and backward Raman excitation.

A Raman excitation light source 105a is arranged upstream to the first nonlinear optical media 107x and 107y so that Raman excitation light is combined with X-polarization signal light and Y-polarization signal light by the multiplexers 106x and 106y, respectively, for forward Raman excitation. A Raman excitation light source 105b is arranged downstream to the second nonlinear optical media 108x and 108y so that Raman excitation light is combined with X-polarization signal light and Y-polarization signal light by the multiplexers 106x and 106y, respectively, for backward Raman excitation.

According to the wavelength converter 1000 of this seventh embodiment, as compared with the third to sixth embodiments, forward Raman excitation and backward Raman excitation are given to assure and increase both the gain by the downstream amplifier (second nonlinear optical medium 108) and the Raman gain from wavelength conversion by the first nonlinear optical medium 107.

FIG. 11 is a configuration diagram of the eighth embodiment of the wavelength converter. A wavelength converter 1100 depicted in FIG. 11 differs from the wavelength converter 1000 of the seventh embodiment (FIG. 10) in that the second nonlinear optical medium 108 is arranged downstream to the polarization beam splitter 601b. The Raman excitation light source 105b performs backward Raman excitation of the second nonlinear optical medium 108 via the depolarizer 901 and the multiplexer 106.

The wavelength converter 1100 of this eighth embodiment has a function effect based on the forward Raman excitation and the backward Raman excitation, similar to the seventh embodiment. As compared with the wavelength converter 1000 of the seventh embodiment (FIG. 10), the wavelength converter 1100 may reduce the number of the second nonlinear optical media 108 as the optical amplification media, since it only requires one second nonlinear optical medium 108.

FIG. 12 is a configuration diagram of the ninth embodiment of the wavelength converter. A wavelength converter 1200 depicted in FIG. 12 is configured to supply wavelength-conversion excitation light and Raman excitation light at the upstream stage and to arrange an optical amplification medium included in a polarization diversity loop circuit at the downstream stage.

The wavelength converter 1200 depicted in FIG. 12 provides polarization control of wavelength-conversion excitation light from the wavelength-conversion excitation light source 103 by a polarization controller 102a, and combines the polarization-controlled wavelength-conversion excitation light with signal light via the multiplexer 104. The multiplexer 106 is arranged downstream to the multiplexer 104. Raman excitation light from the Raman excitation light source 105 is combined with signal light via the depolarizer 901 and the multiplexer 106.

A polarization beam splitter 601 is disposed downstream to the multiplexer 106. The polarization beam splitter 601 allows control of polarization-splitting and combining by a polarization controller 102b. To the polarization beam splitter 601 is connected the polarization diversity loop circuit including the first nonlinear optical medium 107 that performs wavelength conversion and Raman amplification of signal light. To the polarization beam splitter 601 is connected the second nonlinear optical medium 108 amplifying wavelength-converted light, with the optical filter 109 extracting wavelength-converted light for output as signal light.

According to the wavelength converter 1200 of this ninth embodiment, the polarization diversity loop circuit enables diversity path errors to be suppressed as compared with the third to eighth embodiments.

Figure 13:
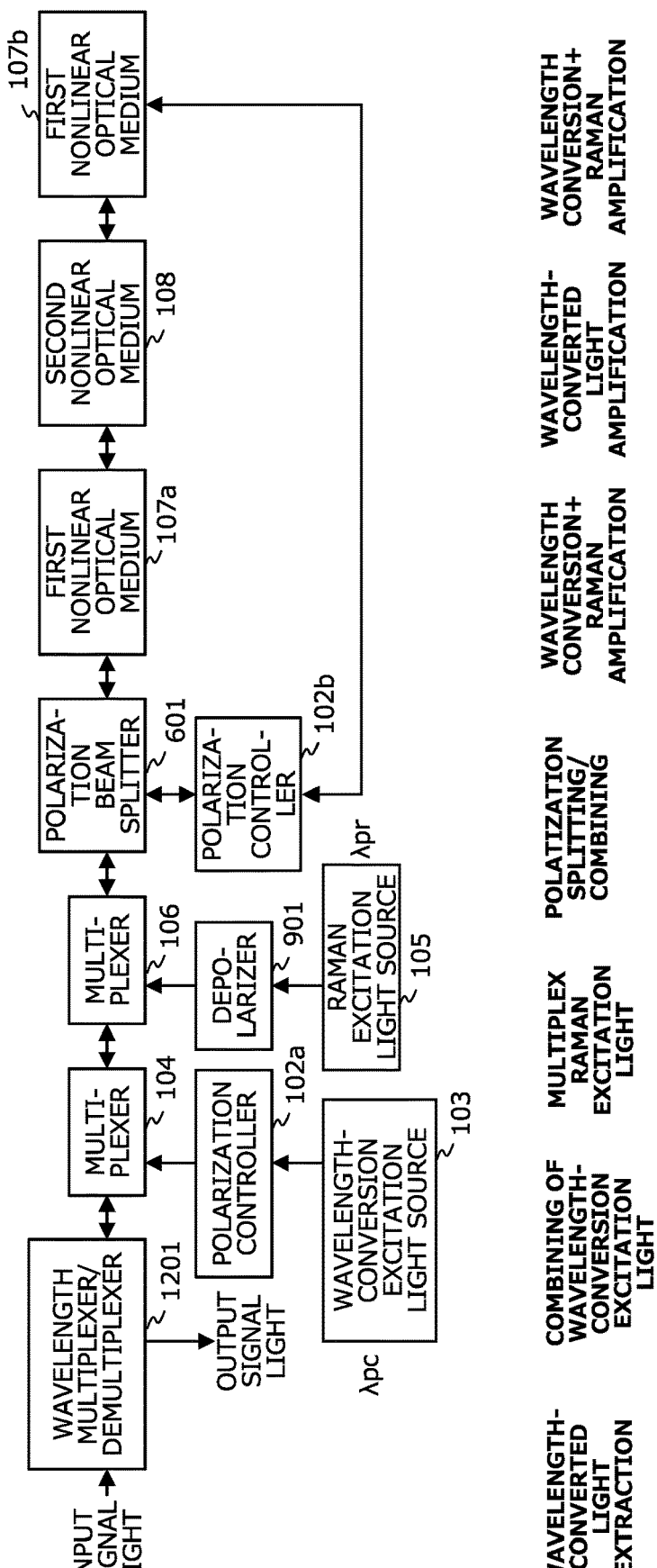
FIG. 13 is a configuration diagram of a tenth embodiment of the wavelength converter.

FIG. 13 is a configuration diagram of the tenth embodiment of the wavelength converter. A wavelength converter 1300 depicted in FIG. 13 is a variant of the ninth embodiment (FIG. 12). In the wavelength converter 1300, a wavelength multiplexer/demultiplexer 1201 is arranged at the upstream stage so that input signal light is wavelength-demultiplexed for output to the downstream stage and so that wavelength-converted light extracted at the downstream stage is output as wavelength-division multiplexed signal light to an external device.

The polarization diversity loop circuit of this wavelength converter 1300 includes two first nonlinear optical media 107a and 107b, with the second nonlinear optical medium 108 being arranged between these two first nonlinear optical media 107a and 107b.

The wavelength converter 1300 of this tenth embodiment has a function effect of the ninth embodiment and achieves reduction in connection loss between the nonlinear optical medium (first nonlinear optical medium 107) and the optical amplification medium (second nonlinear optical medium 108), as compared with the ninth embodiment.

Next, eleventh to eighteenth embodiments depicted in FIGS. 14 to 21 are compatible with polarization multiplexing and have a fundamental configuration of the wavelength converter 100 including the optical filter 310 described in the second embodiment (FIG. 3).

Figure 14:
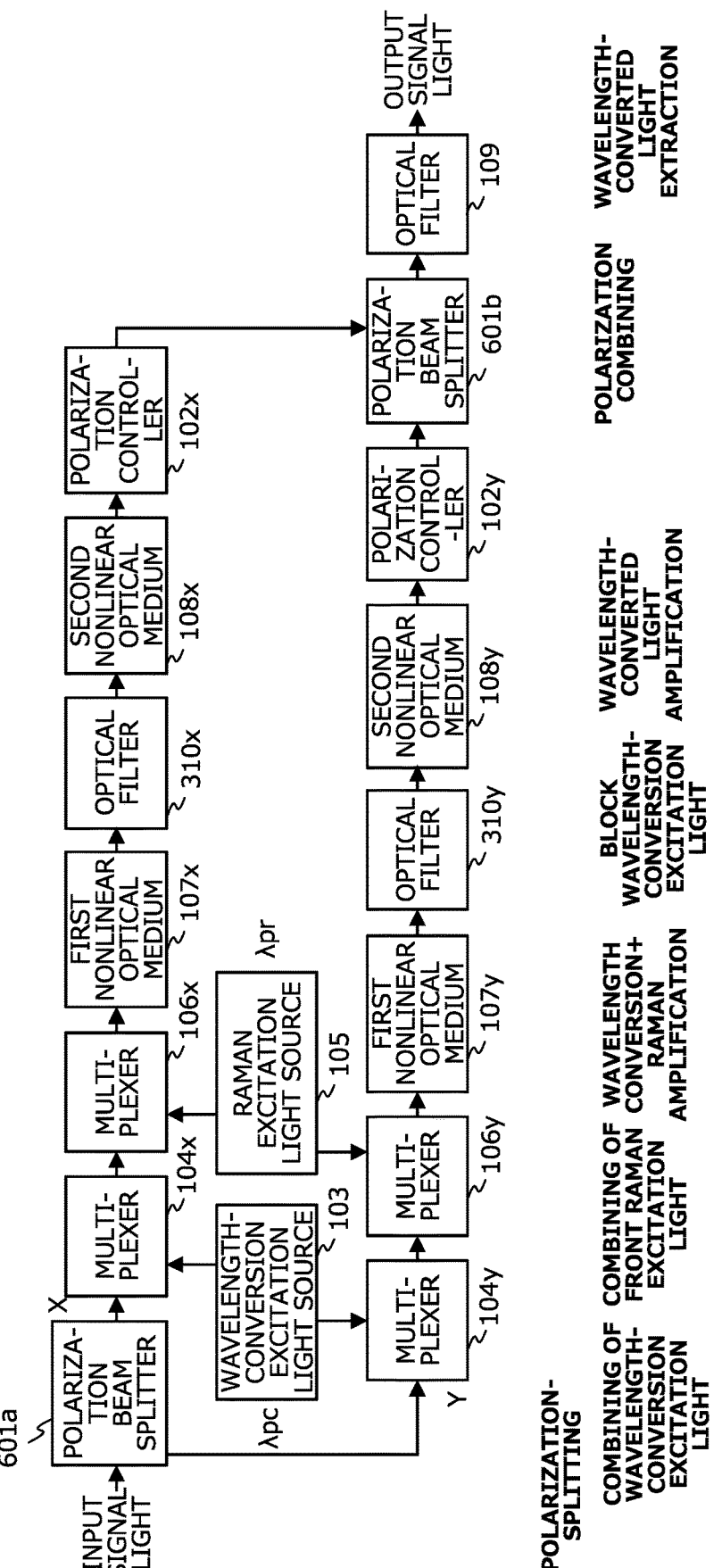
FIG. 14 is a configuration diagram of an eleventh embodiment of the wavelength converter.

FIG. 14 is a configuration diagram of the eleventh embodiment of the wavelength converter. In FIG. 14, the same reference numerals are imparted to the same configuration units as those of the second embodiment (FIG. 3). Polarization-multiplexed signal light input to a wavelength converter 1400 depicted in FIG. 14 is polarization-split by the polarization beam splitter 601a. The polarization controller 600 includes the multiplexer 106, the first nonlinear optical medium 107, the second nonlinear optical medium 108, and the polarization controller 102, which are arranged in each of an x-polarization series and a Y-polarization series after polarization-splitting.

The X-polarization series is described. Wavelength-conversion excitation light from the wavelength-conversion excitation light source 103 is combined with signal light by the multiplexer 104x. Raman excitation light from the Raman excitation light source 105 is combined with signal light by the multiplexer 106x, for forward Raman excitation. Connected following the multiplexer 106x are the first nonlinear optical medium 107x, an optical filter 310x, the second nonlinear optical medium 108x, and the polarization controller 102x. The first nonlinear optical medium 107x performs wavelength conversion and Raman amplification of signal light. The optical filter 310x rejects wavelength-conversion excitation light, for output to the second nonlinear optical medium 108x. The second nonlinear optical medium 108x amplifies wavelength-converted light.

The description of the X-polarization series applies to the Y-polarization series. Wavelength-conversion excitation light from the wavelength-conversion excitation light source 103 is combined with signal light by the multiplexer 104y. Raman excitation light from the Raman excitation light source 105 is combined with signal light by the multiplexer 106y, for forward Raman excitation. Connected following the multiplexer 106y are the first nonlinear optical medium 107y, an optical filter 310y, the second nonlinear optical medium 108y, and the polarization controller 102y. The first nonlinear optical medium 107y performs wavelength conversion and Raman amplification of signal light. The optical filter 310y rejects wavelength-conversion excitation light, for output to the second nonlinear optical medium 108y. The second nonlinear optical medium 108y amplifies wavelength-converted light.

Outputs of the polarization controllers 102x and 102y are provided to the polarization beam splitter 601b. The polarization beam splitter 601b performs polarization-combining of X-polarized wave and Y-polarized wave, for output to the optical filter 109. The optical filter 109 extracts wavelength-converted light, to output the extracted light as signal light.

FIG. 15 is a configuration diagram of the twelfth embodiment of the wavelength converter. A wavelength converter 1500 of the twelfth embodiment differs from the wavelength converter 1400 of the eleventh embodiment (FIG. 14) in that the second nonlinear optical medium 108 is arranged downstream to the polarization beam splitter 601b.

The wavelength converter 1500 of the twelfth embodiment has a function effect of the eleventh embodiment and may reduce the number of the optical amplification media (second nonlinear optical media 108) from the eleventh embodiment. Although the wavelength converter 1400 of the eleventh embodiment depicted in FIG. 14 includes two second nonlinear optical media 108 as the optical amplification medium, the wavelength converter 1500 of this twelfth embodiment needs only to include one second nonlinear optical medium 108, which leads to a reduction in the number thereof.

Figure 16:
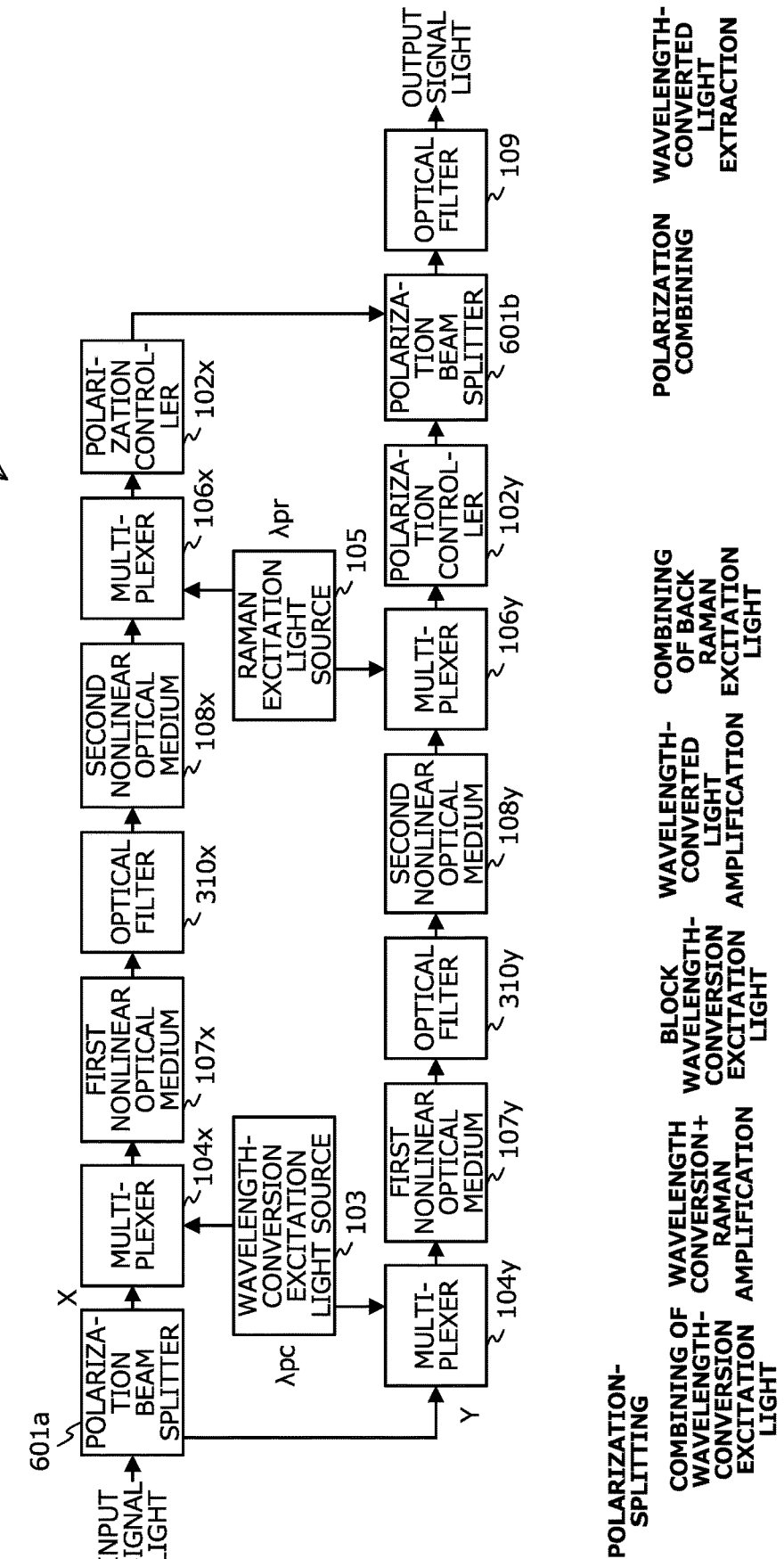
FIG. 16 is a configuration diagram of a thirteenth embodiment of the wavelength converter.

FIG. 16 is a configuration diagram of the thirteenth embodiment of the wavelength converter. A wavelength converter 1600 depicted in FIG. 16 differs from the wavelength converter 1400 of the eleventh embodiment (FIG. 14) in that the Raman excitation light source 105 is arranged downstream to the second nonlinear optical medium 108, to perform backward Raman excitation.

According to the wavelength converter 1600 of this thirteenth embodiment, the Raman amplification gain may be increased as compared with the wavelength converter 1400 of the eleventh embodiment (FIG. 14).

Figure 17:
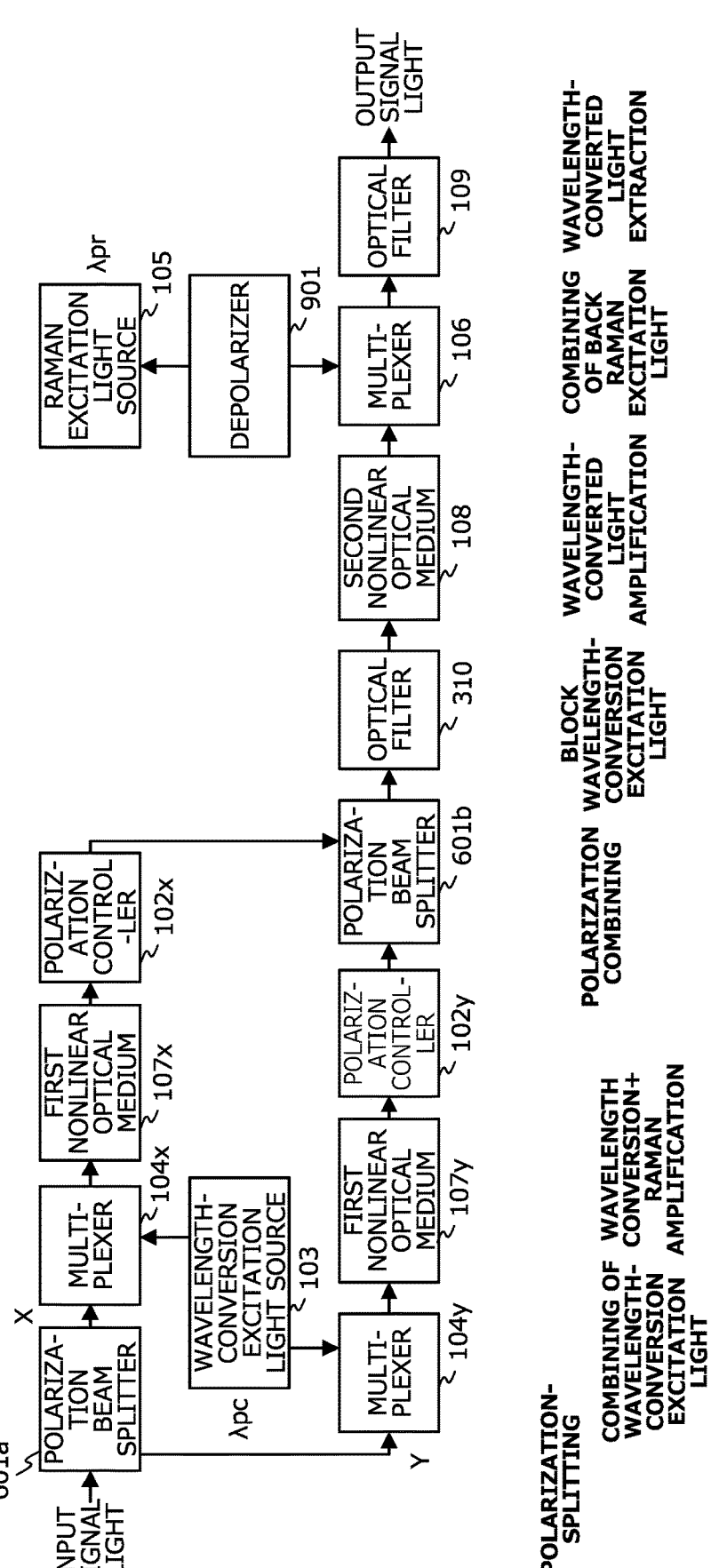
FIG. 17 is a configuration diagram of a fourteenth embodiment of the wavelength converter.

FIG. 17 is a configuration diagram of the fourteenth embodiment of the wavelength converter. A wavelength converter 1700 depicted in FIG. 17 differs from the wavelength converter 1600 of the thirteenth embodiment (FIG. 16) in that the optical filter 310 and the second nonlinear optical medium 108 are arranged downstream to the polarization beam splitter 601b. The Raman excitation light source 105 performs backward Raman excitation of the second nonlinear optical medium 108 via the depolarizer 901 and the multiplexer 106.

The wavelength converter 1700 of the fourteenth embodiment has a function effect of the thirteenth embodiment and may reduce the number of the second nonlinear optical media 108 as the optical amplification media, as compared with the wavelength converter 1600 of the thirteenth embodiment (FIG. 16), since it only requires one second nonlinear optical medium 108.

Figure 18:
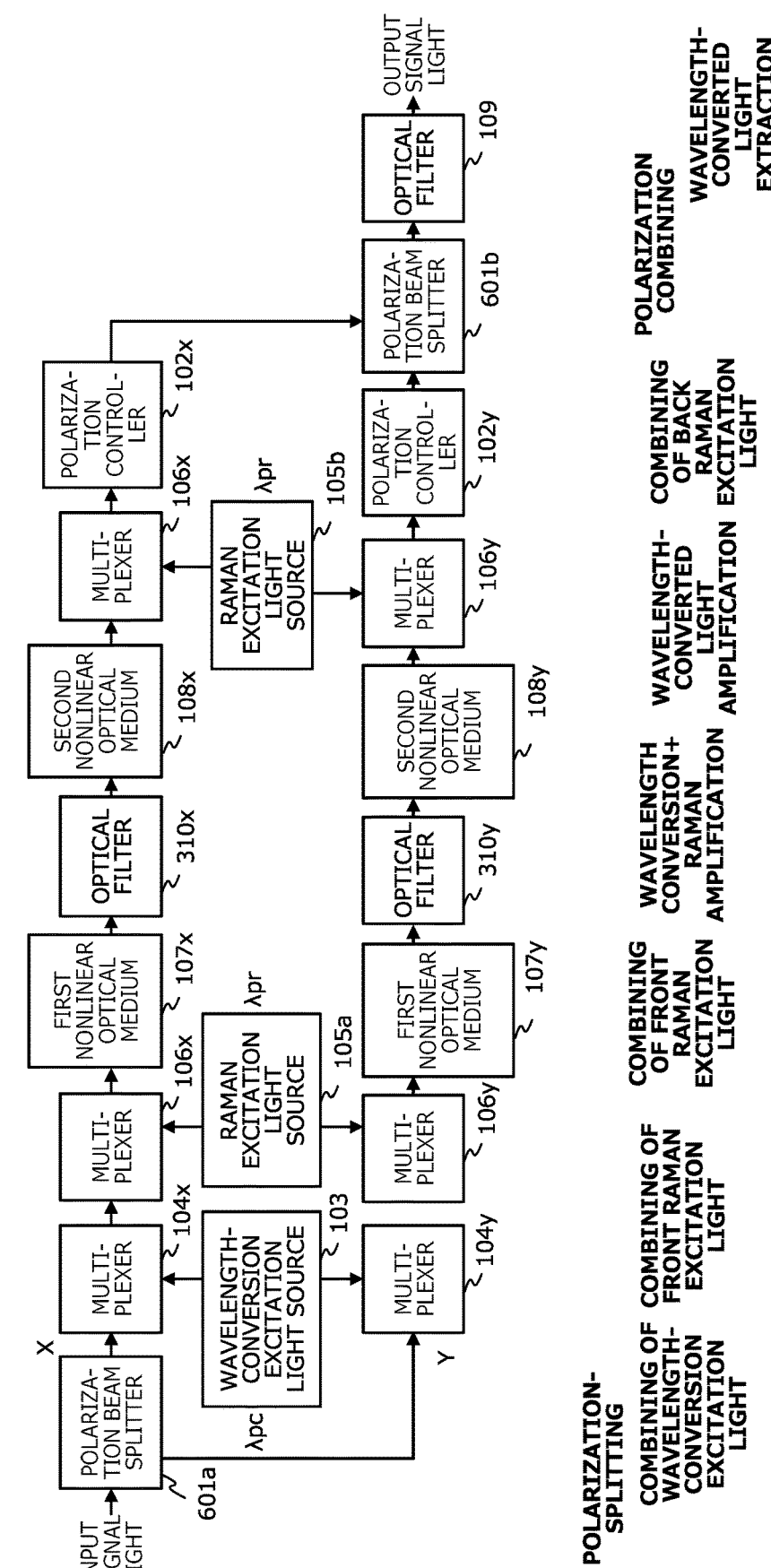
FIG. 18 is a configuration diagram of a fifteenth embodiment of the wavelength converter.

FIG. 18 is a configuration diagram of the fifteenth embodiment of the wavelength converter. A wavelength converter 1800 depicted in FIG. 18 differs from the wavelength converter 1400 for forward Raman excitation of the eleventh embodiment (FIG. 14) in that the Raman excitation light source 105 is additionally arranged downstream to the second nonlinear optical medium 108 to perform forward Raman excitation and backward Raman excitation.

The Raman excitation light source 105a is arranged upstream to the first nonlinear optical media 107x and 107y so that Raman excitation light is combined with X-polarization signal light and Y-polarization signal light by the multiplexers 106x and 106y, respectively, for forward Raman excitation. The optical filters 310x and 310y reject wavelength-conversion excitation light, for output to the second nonlinear optical media 108x and 108y. The Raman excitation light source 105b is arranged downstream to the second nonlinear optical media 108x and 108y so that Raman excitation light is combined with X-polarization signal light and Y-polarization signal light by the multiplexers 106x and 106y, respectively, for backward Raman excitation.

According to the wavelength converter 1800 of this fifteenth embodiment, as compared with the eleventh to fourteenth embodiments, forward Raman excitation and backward Raman excitation are given to assure and increase both the gain by the downstream amplifier (second nonlinear optical medium 108) and the Raman gain from wavelength conversion by the first nonlinear optical medium 107.

Figure 19:
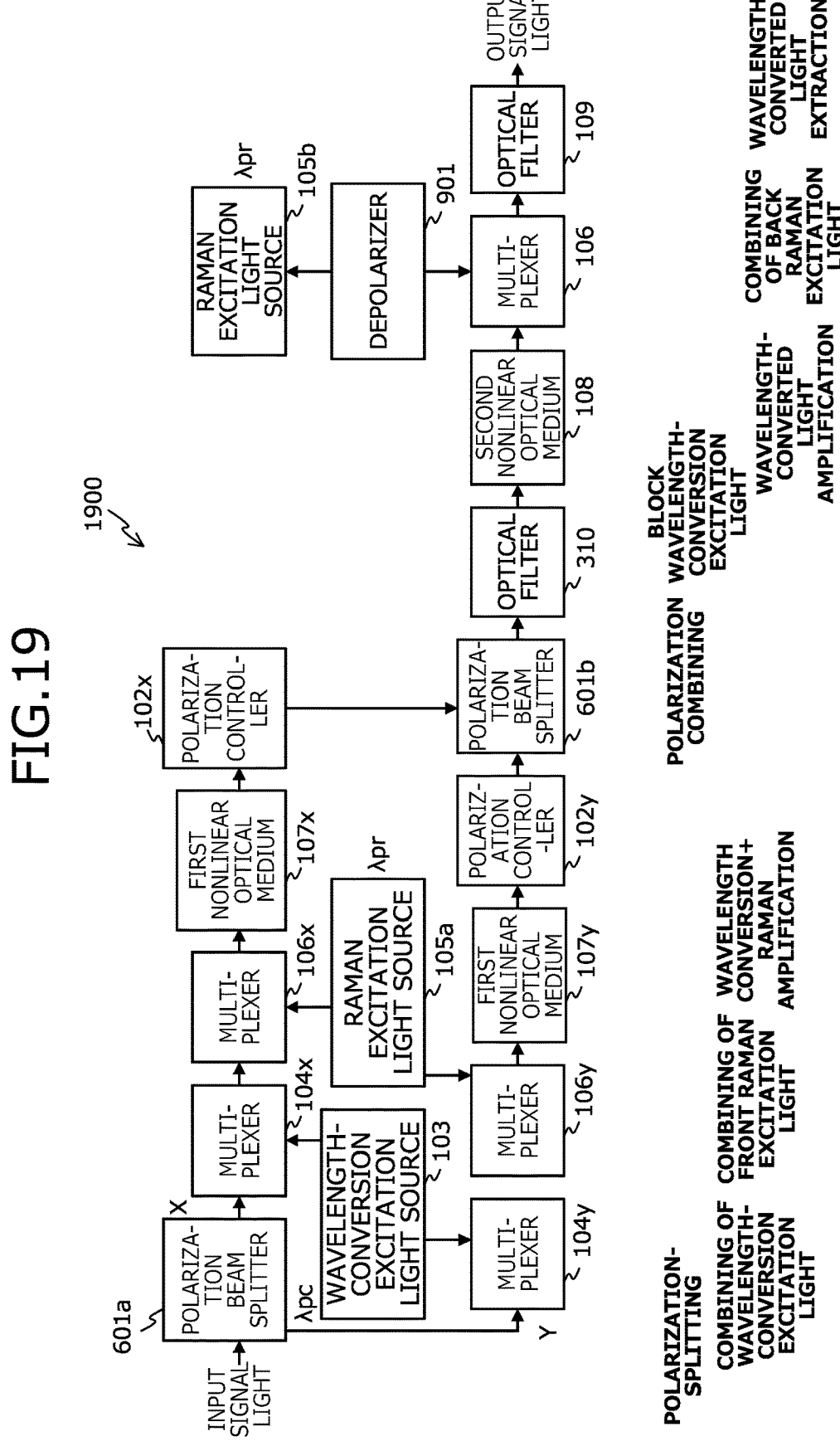
FIG. 19 is a configuration diagram of a sixteenth embodiment of the wavelength converter.

FIG. 19 is a configuration diagram of the sixteenth embodiment of the wavelength converter. A wavelength converter 1900 depicted in FIG. 19 differs from the wavelength converter 1800 of the fifteenth embodiment (FIG. 18) in that the optical filter 310 and the second nonlinear optical medium 108 are arranged downstream to the polarization beam splitter 601b. The Raman excitation light source 105b performs backward Raman excitation of the second nonlinear optical medium 108 via the depolarizer 901 and the multiplexer 106.

The wavelength converter 1900 of this sixteenth embodiment has a function effect based on the forward Raman excitation and the backward Raman excitation, similar to the fifteenth embodiment. As compared with the wavelength converter 1800 of the fifteenth embodiment (FIG. 18), the wavelength converter 1900 may reduce the number of the optical filters 310 and the second nonlinear optical media 108 as the optical amplification media, since it only requires one optical filter 310 and one second nonlinear optical medium 108.

Figure 20:
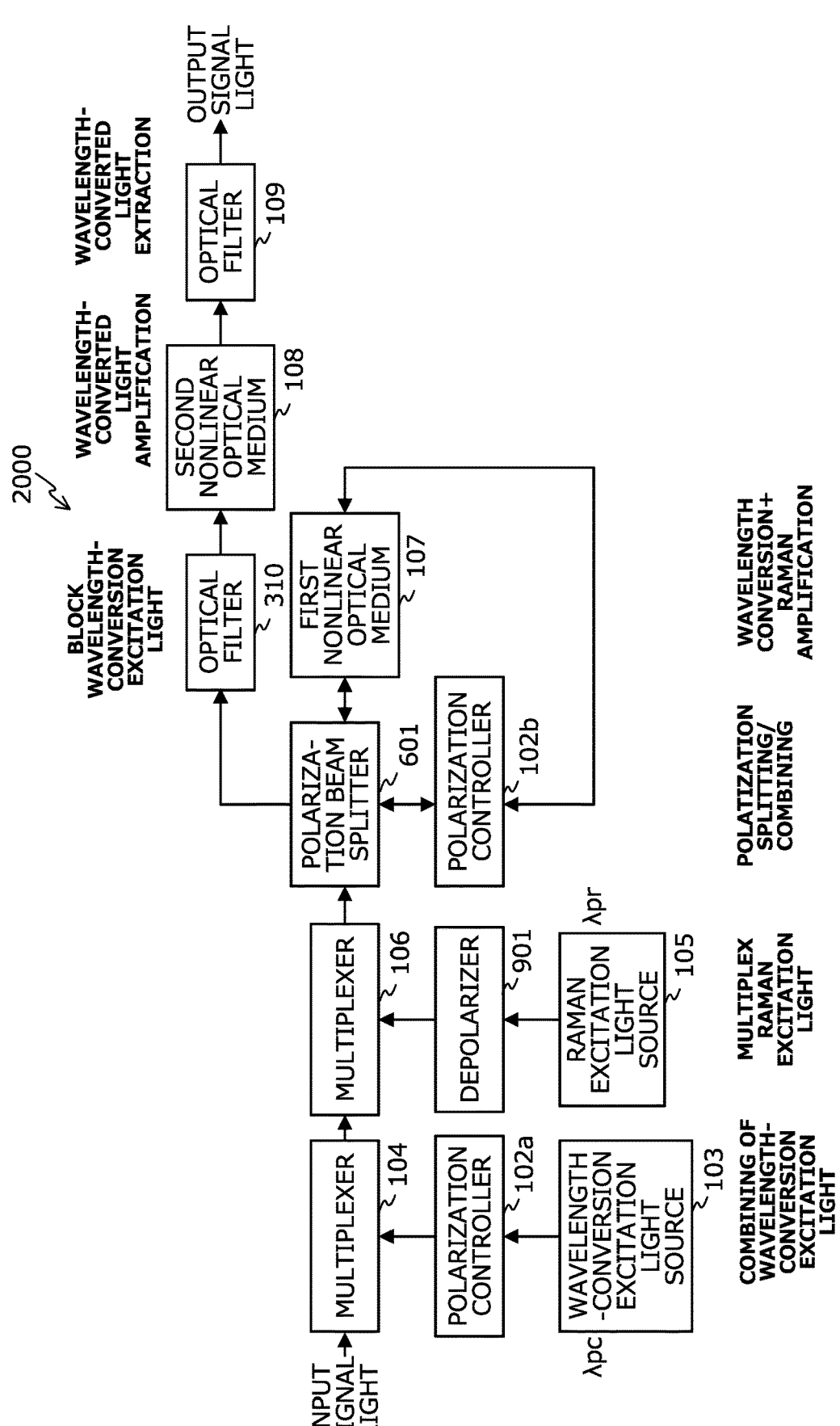
FIG. 20 is a configuration diagram of a seventeenth embodiment of the wavelength converter.

FIG. 20 is a configuration diagram of the seventeenth embodiment of the wavelength converter. A wavelength converter 2000 depicted in FIG. 20 is configured to supply wavelength-conversion excitation light and Raman excitation light at the upstream stage and to arrange the optical amplification medium included in the polarization diversity loop circuit at the downstream stage.

The wavelength converter 2000 depicted in FIG. 20 provides polarization control of wavelength-conversion excitation light from the wavelength-conversion excitation light source 103 by the polarization controller 102a, and combines the polarization-controlled wavelength-conversion excitation light with signal light via the multiplexer 104. The multiplexer 106 is arranged downstream to the multiplexer 104. Raman excitation light from the Raman excitation light source 105 is combined with signal light via the depolarizer 901 and the multiplexer 106.

The polarization beam splitter 601 is disposed downstream to the multiplexer 106. The polarization beam splitter 601 allows control of polarization-splitting and combining by the polarization controller 102b. To the polarization beam splitter 601 is connected the polarization diversity loop circuit including the first nonlinear optical medium 107 that performs wavelength conversion and Raman amplification of signal light. To the polarization beam splitter 601 are connected the optical filter 310 rejecting wavelength-conversion excitation light and the second nonlinear optical medium 108 amplifying wavelength-converted light, with the optical filter 109 extracting wavelength-converted light for output as signal light.

According to the wavelength converter 2000 of this seventeenth embodiment, the polarization diversity loop circuit enables diversity path errors to be suppressed as compared with the eleventh to sixteenth embodiments.

Figure 21:
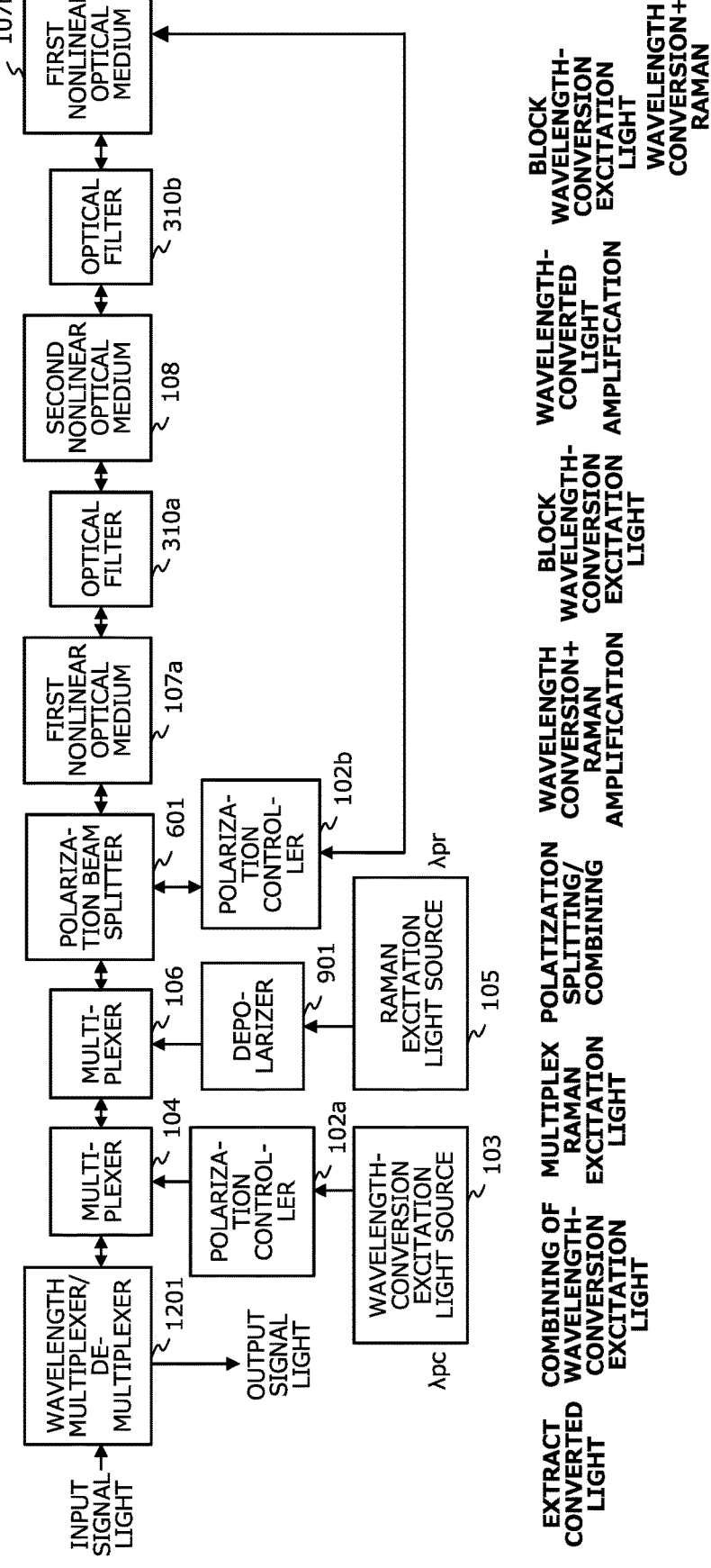
FIG. 21 is a configuration diagram of an eighteenth embodiment of the wavelength converter.

FIG. 21 is a configuration diagram of the eighteenth embodiment of the wavelength converter. A wavelength converter 2100 depicted in FIG. 21 is a variant of the seventeenth embodiment (FIG. 20). In the wavelength converter 2100, the wavelength multiplexer/demultiplexer 1201 is arranged at the upstream stage so that input signal light is wavelength-demultiplexed for output to the downstream stage and so that wavelength-converted light extracted at the downstream stage is output as wavelength-division multiplexed signal light to the exterior.

The polarization diversity loop circuit of this wavelength converter 2100 includes the two first nonlinear optical media 107a and 107b and two optical filters 310a and 310b rejecting wavelength-conversion excitation light. The polarization diversity loop circuit provides loop connection from the first nonlinear optical medium 107a through the optical filter 310a, the second nonlinear optical medium 108, and the optical filter 310b to the first nonlinear optical medium 107b.

The wavelength converter 2100 of this eighteenth embodiment has a function effect of the seventeenth embodiment and achieves reduction in connection loss between the nonlinear optical medium (first nonlinear optical medium 107) and the optical amplification medium (second nonlinear optical medium 108), as compared with the seventeenth embodiment.

The wavelength converter of the embodiment set forth hereinabove includes: a first multiplexer that combines input signal light with wavelength-conversion excitation light; a second multiplexer that combines the input signal light with Raman excitation light; a first nonlinear optical medium that generates wavelength-converted light of signal light output from the second multiplexer, based on nonlinear optical effect; and a second nonlinear optical medium that amplifies wavelength-converted light of signal light. The wavelength of Raman excitation light is a wavelength within an amplification band that allows Raman amplification of wavelength-converted light. It is therefore possible to perform wavelength conversion while amplifying by the first nonlinear optical medium and to optically amplify wavelength-converted light by the second nonlinear optical medium, whereupon output power may be enhanced while suppressing the occurrence of nonlinear noise. This enables transmission capacity in optical transmission to be expanded.

In the wavelength converter, the second nonlinear optical medium may have a zero-dispersion wavelength greater than that of the first nonlinear optical medium in the chromatic dispersion absolute value within wavelength bands of signal light and wavelength-converted light. For example, the first nonlinear optical medium has a zero-dispersion wavelength that is a wavelength between wavelengths of input signal light and wavelength-converted light with a chromatic dispersion absolute value of less than 3 ps/nm/km, whereas the second nonlinear optical medium has a zero-dispersion wavelength that is longer than that of the first nonlinear optical medium with a chromatic dispersion absolute value of 3 ps/nm/km or more. This enables output power to be enhanced while suppressing the occurrence of nonlinear noise by using the first nonlinear optical medium and the second nonlinear optical medium.

The wavelength converter is disposed upstream to the second nonlinear optical medium and includes an optical filter that rejects the wavelength of the wavelength-conversion excitation light. The first nonlinear optical medium and the second nonlinear optical medium may have an identical dispersion characteristic. This enables output power to be enhanced while suppressing the occurrence of nonlinear noise by using the first nonlinear optical medium and the second nonlinear optical medium.

The wavelength converter may be disposed downstream to the second nonlinear optical medium and may include an optical filter that extracts the wavelength of the wavelength-converted light. This enables the wavelength converter to output wavelength-converted light that has been wavelength-converted from signal light.

The wavelength converter may include a first polarization beam splitter disposed at an input stage, for polarization-splitting the signal light, and a second polarization beam splitter disposed downstream to the first nonlinear optical medium, for polarization-combining the signal light. This enables wavelength conversion of polarization diversity signal light.

In the wavelength converter, the second multiplexer may be arranged upstream to the first nonlinear optical medium to provide forward excitation by Raman excitation light, or the second multiplexer may be disposed downstream to the second nonlinear optical medium to provide backward excitation by Raman excitation light, or a combination thereof may be employed. This achieves improvement in optical amplification characteristics of wavelength-converted light.

The wavelength converter may include: a polarization beam splitter that performs polarization splitting and polarization combining of input signal light; a polarization controller that variably controls the polarization beam splitter; and a polarization diversity loop circuit that is connected to the polarization beam splitter and includes the first nonlinear optical medium. This achieves reduction in connection loss between the first nonlinear optical medium and the second nonlinear optical medium while converting the wavelength of the polarization diversity signal light.

In the wavelength converter, the first nonlinear optical medium and the second nonlinear optical medium may be configured from optical fiber or a planar optical waveguide.

The optical transmission system of the embodiment is a system in which signal light sent from a transmitting device is received via a transmission path by a receiving device. The transmitting device includes: multiple transmitters that convert an input electrical signal into signal light within a first wavelength band; a wavelength converter that converts signal light output from some of the plurality of transmitters into signal light within a second wavelength band; and a multiplexer that combines together signal light output from the plurality of transmitters and signal light output from the wavelength converter. The receiving device includes: a demultiplexer that splits signal light received from the transmission path into signal light within the first wavelength band and signal light within the second wavelength band; a wavelength converter that converts the split signal light within the second wavelength band into a signal within the first wavelength band; and multiple receivers that convert multiple signal lights within the first wavelength band output from the demultiplexer and the wavelength converter into electric signals. The wavelength converter includes: a first multiplexer that combines the input signal light with wavelength-conversion excitation light; a second multiplexer that combines signal light with Raman excitation light; a first nonlinear optical medium that generates wavelength-converted light of the signal light output from the second multiplexer, based on nonlinear optical effect; and a second nonlinear optical medium that amplifies the wavelength-converted light of the signal light output from the first nonlinear optical medium, with the wavelength of the Raman excitation light being a wavelength within an amplification band that allows Raman amplification of wavelength-converted light. It is therefore possible to perform wavelength conversion while amplifying by the first nonlinear optical medium and to optically amplify wavelength-converted light by the second nonlinear optical medium, whereupon output power may be enhanced while suppressing the occurrence of nonlinear noise. This achieves a low-cost configuration of the transmitting device and the receiving device by using optical components within a common wavelength band as the transmitting device and the receiving device, which enables transmission capacity in optical transmission to be expanded.

An aspect of the present invention provides an effect of increasing the output power while suppressing the occurrence of nonlinear noise to enable expansion of transmission capacity.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength converter comprising:
a first multiplexer that combines signal light input to the wavelength converter and wavelength-conversion excitation light;
a second multiplexer that combines the signal light and Raman excitation light;
a first nonlinear optical medium that generates wavelength-converted light of the signal light, based on a nonlinear optical effect;
a second nonlinear optical medium that amplifies the wavelength-converted light of the signal light output from the first nonlinear optical medium,
a first polarization beam splitter disposed upstream to the first nonlinear optical medium, the first polarization beam splitter performing polarization-splitting to the signal light; and
a second polarization beam splitter disposed downstream to the first nonlinear optical medium, the second polarization beam splitter performing polarization-combining to the signal light, wherein
a wavelength of the Raman excitation light is a wavelength within an amplification band that allows Raman amplification of the wavelength-converted light.

2. The wavelength converter according to claim 1, wherein the second nonlinear optical medium has a zero-dispersion wavelength greater than that of the first nonlinear optical medium in chromatic dispersion absolute value within wavelength bands of the signal light and the wavelength-converted light.

3. The wavelength converter according to claim 2, wherein the first nonlinear optical medium has a zero-dispersion wavelength that is a wavelength between wavelengths of the signal light input and the wavelength-converted light, with a chromatic dispersion absolute value of less than 3 ps/nm/km, and the second nonlinear optical medium has a zero-dispersion wavelength that is longer than that of the first nonlinear optical medium, with a chromatic dispersion absolute value of 3 ps/nm/km or more.

4. The wavelength converter according to claim 1, further comprising an optical filter that is disposed upstream to the second nonlinear optical medium and rejects passage of a wavelength of the wavelength-conversion excitation light.

5. The wavelength converter according to claim 1, further comprising an optical filter that is disposed downstream to the second nonlinear optical medium and extracts a wavelength of the wavelength-converted light.

6. The wavelength converter according to claim 1, wherein the second multiplexer is disposed upstream to the first nonlinear optical medium and provides forward excitation by the Raman excitation light, or the second multiplexer is disposed downstream to the second nonlinear optical medium and provides backward excitation by the Raman excitation light, or both.

7. The wavelength converter according to claim 1, wherein the first nonlinear optical medium and the second nonlinear optical medium are an optical fiber or a planar optical waveguide.

8. An optical transmission system, comprising:
a transmitting device that transmits signal light; and
a receiving device that receives the signal light via a transmission path, wherein
the transmitting device includes:
a plurality of transmitters that convert an electrical signal input thereto into a plurality of first signal light components within a first wavelength band;
a first wavelength converter that converts the plurality of first signal light components output from a portion of the plurality of transmitters, into a plurality of second signal light components within a second wavelength band; and
a multiplexer that combines the plurality of first signal light components output from the portion of the plurality of transmitters and the plurality of second signal light components output from the first wavelength converter,
the receiving device includes:
a demultiplexer that splits the signal light received from the transmission path into the plurality of first signal light components within the first wavelength band and the plurality of second signal light components within the second wavelength band;
a second wavelength converter that converts the split plurality of second signal light components within the second wavelength band into the plurality of first signal light components within the first wavelength band; and
a plurality of receivers that convert the plurality of first signal light components within the first wavelength band output from the demultiplexer and the second wavelength converter into electric signals,
the first and second wavelength converters each includes:
a first multiplexer that combines the input signal light with wavelength-conversion excitation light;
a second multiplexer that combines the signal light with Raman excitation light;
a first nonlinear optical medium that generates wavelength-converted light of the signal light, based on nonlinear optical effect; and
a second nonlinear optical medium that amplifies the wavelength-converted light of the signal light output from the first nonlinear optical medium, wherein the wavelength of the Raman excitation light is within an amplification band that allows Raman amplification of the wavelength-converted light.

9. A wavelength converter comprising:

a first multiplexer that combines signal light input to the wavelength converter and wavelength-conversion excitation light;

a second multiplexer that combines the signal light output from the first multiplexer and Raman excitation light;

a first nonlinear optical medium that generates wavelength-converted light of the signal light output from the second multiplexer, based on a nonlinear optical effect;

a second nonlinear optical medium that amplifies the wavelength-converted light output from the first nonlinear optical medium;

a polarization beam splitter that performs polarization splitting and polarization combining of the signal light input to the wavelength converter;

a polarization controller that variably controls the polarization beam splitter; and a polarization diversity loop circuit that is connected to the polarization beam splitter and includes the first nonlinear optical medium, wherein a wavelength of the Raman excitation light is a wavelength within an amplification band that allows Raman amplification of the wavelength-converted light.

10. The wavelength converter according to claim 9, further comprising an optical filter that is disposed upstream to the second nonlinear optical medium and rejects passage of a wavelength of the wavelength-conversion excitation light.

11. The wavelength converter according to claim 9, further comprising an optical filter that is disposed downstream to the second nonlinear optical medium and extracts a wavelength of the wavelength-converted light.

12. A wavelength converter comprising:

a first multiplexer that combines signal light input to the wavelength converter and wavelength-conversion excitation light;

a second multiplexer that combines the signal light output from the first multiplexer and Raman excitation light;

a first nonlinear optical medium that generates wavelength-converted light of the signal light output from the second multiplexer, based on a nonlinear optical effect; and a second nonlinear optical medium that amplifies the wavelength-converted light output from the first nonlinear optical medium, wherein a wavelength of the Raman excitation light is a wavelength within an amplification band that allows Raman amplification of the wavelength-converted light, and the wavelength converter further includes an optical filter that is disposed upstream to the second nonlinear optical medium and rejects passage of a wavelength of the wavelength-conversion excitation light, or that is disposed downstream to the second nonlinear optical medium and extracts a wavelength of the wavelength-converted light.

* * * * *